(12) United States Patent
Miyachi et al.

(10) Patent No.: US 9,798,179 B2
(45) Date of Patent: Oct. 24, 2017

(54) LIQUID CRYSTAL DISPLAY DEVICE

(75) Inventors: Koichi Miyachi, Osaka (JP); Isamu Miyake, Osaka (JP)

(73) Assignee: MERCK PATENT GMBH, Darmstadt (DE)

( * ) Notice: Subject to any disclaimer, the term of this patent is extended or adjusted under 35 U.S.C. 154(b) by 208 days.

(21) Appl. No.: 13/879,468

(22) PCT Filed: Oct. 14, 2011

(86) PCT No.: PCT/JP2011/073600
§ 371 (c)(1),
(2), (4) Date: Apr. 15, 2013

(87) PCT Pub. No.: WO2012/050178
PCT Pub. Date: Apr. 19, 2012

(65) Prior Publication Data
US 2013/0222740 A1    Aug. 29, 2013

(30) Foreign Application Priority Data

Oct. 14, 2010 (JP) .................................. 2010-231924
Apr. 6, 2011 (JP) .................................. 2011-084755
Aug. 12, 2011 (JP) .................................. 2011-177293

(51) Int. Cl.
*G02F 1/1334* (2006.01)
*C09K 19/02* (2006.01)
(Continued)

(52) U.S. Cl.
CPC ........ *G02F 1/1334* (2013.01); *C09K 19/0225* (2013.01); *C09K 19/32* (2013.01);
(Continued)

(58) Field of Classification Search
CPC ............. G02F 1/1334; G02F 1/133703; G02F 1/133711; G02F 1/133715;
(Continued)

(56) References Cited

U.S. PATENT DOCUMENTS 4,950,795 A * 8/1990 Husler .................. C07C 45/515
522/35
5,570,216 A  10/1996 Lu
(Continued)

FOREIGN PATENT DOCUMENTS

CN          1656413 A    8/2005
CN        101581844 A   11/2009
(Continued)

OTHER PUBLICATIONS

International Search Report issued in Application No. PCT/JP2011/073599, dated Nov. 29, 2011.
(Continued)

*Primary Examiner* — Eli D Strah
(74) *Attorney, Agent, or Firm* — Millen, White, Zelano & Branigan, P.C.

(57) ABSTRACT

The present invention provides a liquid crystal display device that includes a horizontal alignment film, stabilizes liquid crystal alignment by the PSA technique, can suppress the increase in power consumption, reduction in contrast, and image sticking in display, and has long-term reliability. The present invention is a liquid crystal display device including a pair of substrates, a liquid crystal layer interposed between the pair of substrates, a horizontal alignment film formed on at least one of the pair of substrates, and a polymer layer which is formed on the horizontal alignment film and controls the alignment of adjacent liquid crystal molecules, wherein the polymer layer is formed by the polymerization of at least one or more kinds of monomers added into the liquid crystal layer, and at least one of the one or more kinds of monomers is polymerized by itself functioning as a polymerization initiator by being irradiated with light.

14 Claims, 6 Drawing Sheets

(51) Int. Cl.
*C09K 19/32* (2006.01)
*C09K 19/04* (2006.01)
*C08L 33/14* (2006.01)

(52) U.S. Cl.
CPC ......... *B32B 2457/202* (2013.01); *C08L 33/14* (2013.01); *C09K 2019/0448* (2013.01); *Y10T 428/105* (2015.01); *Y10T 428/1023* (2015.01); *Y10T 428/1077* (2015.01); *Y10T 428/1082* (2015.01)

(58) Field of Classification Search
CPC ......... G02F 1/133726; G02F 1/133738; G02F 1/133792; C09K 19/32; C09K 19/0225; C09K 2019/0448; C08L 33/14; B32B 2457/202; Y10T 428/1005; Y10T 428/1036; Y10T 428/105; Y10T 428/1082; Y10T 428/1077; Y10T 428/1023
USPC ...... 349/88, 89, 123, 132, 135; 428/1.2, 1.3, 428/1.33
See application file for complete search history.

(56) References Cited

U.S. PATENT DOCUMENTS

| | | | |
|---|---|---|---|
| 5,965,691 A * | 10/1999 | Gibbons et al. | 528/353 |
| 6,177,972 B1 | 1/2001 | Held et al. | |
| 6,201,588 B1 | 3/2001 | Walton et al. | |
| 6,256,082 B1 | 7/2001 | Suzuki et al. | |
| 6,300,926 B1 | 10/2001 | Yoneya | |
| 6,466,293 B1 | 10/2002 | Suzuki et al. | |
| 6,597,422 B1 | 7/2003 | Fuenfschilling et al. | |
| 7,643,124 B2 | 1/2010 | Pai et al. | |
| 8,647,724 B2 * | 2/2014 | Mizusaki et al. | 428/1.1 |
| 9,217,897 B2 * | 12/2015 | Hakoi | G02F 1/133711 349/123 |
| 2002/0098295 A1 | 7/2002 | Yip et al. | |
| 2003/0086044 A1 | 5/2003 | Inoue et al. | |
| 2003/0202143 A1 | 10/2003 | Yoshida | |
| 2003/0231272 A1 | 12/2003 | Nakamura et al. | |
| 2004/0080685 A1 * | 4/2004 | Yamada et al. | 349/113 |
| 2005/0116200 A1 | 6/2005 | Nakanishi et al. | |
| 2005/0136196 A1 | 6/2005 | Kataoka | |
| 2005/0179006 A1 | 8/2005 | Imamura et al. | |
| 2005/0206809 A1 | 9/2005 | Kim et al. | |
| 2005/0253988 A1 | 11/2005 | Inoue et al. | |
| 2005/0264737 A1 | 12/2005 | Kataoka et al. | |
| 2006/0055858 A1 | 3/2006 | Nakanishi et al. | |
| 2006/0061719 A1 * | 3/2006 | Tomioka et al. | 349/123 |
| 2006/0256258 A1 | 11/2006 | Kim et al. | |
| 2008/0124493 A1 | 5/2008 | Sawatari et al. | |
| 2008/0179565 A1 | 7/2008 | Hsieh et al. | |
| 2008/0236727 A1 | 10/2008 | Hsieh et al. | |
| 2008/0293888 A1 | 11/2008 | Bachels et al. | |
| 2009/0051854 A1 | 2/2009 | Okabe et al. | |
| 2009/0061117 A1 | 3/2009 | Oyama | |
| 2009/0086139 A1 | 4/2009 | Pai et al. | |
| 2009/0103011 A1 | 4/2009 | Bernatz et al. | |
| 2009/0103034 A1 | 4/2009 | Asada et al. | |
| 2009/0141215 A1 | 6/2009 | Bremer et al. | |
| 2009/0268138 A1 | 10/2009 | Nakamura | |
| 2009/0269515 A1 | 10/2009 | Kataoka | |
| 2009/0324853 A1 | 12/2009 | Bernatz et al. | |
| 2009/0325453 A1 | 12/2009 | Lee | |
| 2010/0149446 A1 | 6/2010 | Fujisawa et al. | |
| 2011/0043729 A1 | 2/2011 | Nakanishi et al. | |
| 2011/0051049 A1 * | 3/2011 | Goetz | C09K 19/32 349/86 |
| 2011/0095229 A1 | 4/2011 | Lee et al. | |
| 2011/0101269 A1 | 5/2011 | Bernatz et al. | |
| 2011/0199566 A1 | 8/2011 | Mazusaki et al. | |
| 2011/0234955 A1 * | 9/2011 | Mizusaki | C08G 73/1042 349/123 |
| 2011/0267574 A1 | 11/2011 | Kawahira et al. | |
| 2011/0318595 A1 * | 12/2011 | Breiner | C09D 4/00 428/522 |
| 2012/0008079 A1 | 1/2012 | Mizusaki et al. | |
| 2012/0076952 A1 | 3/2012 | Bachels et al. | |
| 2012/0261846 A1 | 10/2012 | Nakanishi et al. | |
| 2012/0262657 A1 | 10/2012 | Nakanishi et al. | |
| 2013/0004679 A1 | 1/2013 | Bachels et al. | |
| 2013/0222740 A1 | 8/2013 | Miyachi et al. | |
| 2013/0271713 A1 | 10/2013 | Miyake et al. | |
| 2013/0335651 A1 | 12/2013 | Lee et al. | |
| 2013/0335652 A1 | 12/2013 | Lee et al. | |
| 2013/0335653 A1 | 12/2013 | Lee et al. | |
| 2014/0111754 A1 * | 4/2014 | Matsumoto et al. | 349/123 |
| 2014/0139794 A1 * | 5/2014 | Ohnishi et al. | 349/123 |

FOREIGN PATENT DOCUMENTS

| | | | | |
|---|---|---|---|---|
| CN | 101646695 A | 2/2010 | | |
| DE | WO 2009118086 A1 * | 10/2009 | | C09K 19/32 |
| DE | WO 2010112474 A1 * | 10/2010 | | C09D 4/00 |
| EP | 1 498 468 A1 | 1/2005 | | |
| JP | 9-227454 | 9/1997 | | |
| JP | 10-227998 | 8/1998 | | |
| JP | 10-268318 | 10/1998 | | |
| JP | 11-295740 | 10/1999 | | |
| JP | 3337045 | 8/2002 | | |
| JP | 2002-532755 | 10/2002 | | |
| JP | 2003-307720 | 10/2003 | | |
| JP | 2004-070185 | 3/2004 | | |
| JP | 2004-286984 | 10/2004 | | |
| JP | 2005-181582 | 7/2005 | | |
| JP | 2005-258428 | 9/2005 | | |
| JP | 2005-266744 | 9/2005 | | |
| JP | 2005-338613 | 12/2005 | | |
| JP | 2006-078968 | 3/2006 | | |
| JP | 2006-215184 | 8/2006 | | |
| JP | 2006-348227 | 12/2006 | | |
| JP | 2007-092000 | 4/2007 | | |
| JP | 2007-114361 | 5/2007 | | |
| JP | 2008-076950 | 4/2008 | | |
| JP | 4175826 | 11/2008 | | |
| JP | 2009-036861 | 2/2009 | | |
| JP | 2009-64035 | 3/2009 | | |
| JP | 4237977 | 3/2009 | | |
| JP | 2009-102639 | 5/2009 | | |
| JP | 2009-520702 | 5/2009 | | |
| JP | 2009-132718 | 6/2009 | | |
| JP | 2009-265266 | 11/2009 | | |
| JP | 2009-265308 | 11/2009 | | |
| JP | 2009-300990 | 12/2009 | | |
| JP | 2010-033093 | 2/2010 | | |
| JP | WO 2010061491 A1 * | 6/2010 | | C08G 73/1042 |
| JP | 2010-152170 | 7/2010 | | |
| JP | 2011-515543 | 5/2011 | | |
| JP | 2011-525553 | 9/2011 | | |
| TW | I278706 B | 4/2007 | | |
| TW | 200933267 A | 8/2009 | | |
| TW | 201009053 A1 | 3/2010 | | |
| WO | 2006/093131 A1 | 9/2006 | | |
| WO | WO 2006/123749 | 11/2006 | | |
| WO | 2009/030322 A1 | 3/2009 | | |
| WO | 2009/156118 | 12/2009 | | |
| WO | 2010/047011 A1 | 4/2010 | | |
| WO | 2010/079703 A1 | 7/2010 | | |
| WO | 2010/116564 | 10/2010 | | |
| WO | WO 2010/116551 | 10/2010 | | |
| WO | 2012-105479 | 8/2012 | | |

OTHER PUBLICATIONS

Nagatake, et al., "Reduction of EO Hysteresis of Photo-Aligned IPS-LCDs with Polymer Stabilized Method," Proceedings of the Japanese Liquid Crystal Society Annual Meetings 2010, Sep. 2010, 2 pages.

Kikuchi et al., "Polymer-stabilized Liquid Crystal Blue Phases," Nature Materials, vol. 1., 2002, pp. 64-68.

(56) References Cited

OTHER PUBLICATIONS

The Institute of Electronics, "Information and Communication Engineers Technical Research Report," EID95-17, vol. 95, 1995, pp. 43-48.
U.S. Office Action mailed Jan. 15, 2015 in U.S. Appl. No. 13/879,447.
International Search Report for PCT/JP2011/073600, mailed Jan. 17, 2012.
Nagatake, Y. et al., "Research on the Improvement of Hysteresis Characteristics of Optical Alignment LCD Using Polymer Stabilization Technique", Lecture Prodeedings of the Japanese Liquid Crystal Society Forum 2010, The Japanese Liquid Crystal Society, (Aug. 27, 2010), Lecture No. 2b02.
Nagatake, Y. et al., "Hysteresis Reduction in EO Characteristics of Photo-Aligned IPS-LCDs with Polymer-Surface-Stabilized Method", IDW' 10:Proceedings of the $17^{th}$ International Display Workshops, IDW' 10 Publication Committee, (2010), LCTp. 2-5, pp. 89-92.
International Search Report for PCT/JP2011/073603 mailed Nov. 29, 2011.
Y, Momoi et al., P-131: New Model of Image Sticking Mechanism on Long Period AC Field of IPS Mode, SID 09 Digest, 2009, pp. 1161-1164.

Office Action for U.S. Appl. No. 13/879,502 mailed Sep. 8, 2015; Miyake.
Office Action for U.S. Appl. No. 13/879,447 mailed May 6, 2015; Miyake.
International Search Report for PCT/JP2009/067569, mailed Jan. 12, 2010.
Notice of Allowance mailed Nov. 25, 2013 in U.S. Appl. No. 13/257,797.
Office Action mailed Jun. 6, 2013 in U.S. Appl. No. 13/257,797.
Restriction Requirement mailed Apr. 2, 2013 in U.S. Appl. No. 13/257,797.
International Search Report with English translation mailed Sep. 25, 2012 in PCT Application PCT/JP2012/069080.
International Search Report with English translation mailed Aug. 14, 2012 in PCT Application PCT/JP2012/065681.
Office Action for U.S. Appl. No. 13/879,502 mailed Jan. 7, 2016; Miyake.
Advisory Action for U.S. Appl. No. 13/879,447 mailed Sep. 16, 2015; Miyake.
Office Action for U.S. Appl. No. 13/879,447 mailed Nov. 5, 2015; Miyake.
Advisory Action for U.S. Appl. No. 13/879,502 mailed Apr. 18, 2016; Miyake.

\* cited by examiner

LIQUID CRYSTAL DISPLAY DEVICE

This application is the U.S. national phase of International Application No. PCT/JP2011/073600, filed 14 Oct. 2011, which designated the U.S. and claims priority to Japanese Application No. 2010-231924, filed 14 Oct. 2010; Japanese Application No. 2011-084755, filed 6 Apr. 2011; and Japanese Application No. 2011-177293, filed 12 Aug. 2011, the entire contents of each of which are hereby incorporated by reference.

TECHNICAL FIELD

The present invention relates to a liquid crystal display device. More specifically, the present invention relates to a liquid crystal display device in which a polymer layer is formed on a horizontal alignment film.

BACKGROUND ART

A Liquid Crystal Display (LCD) device is a display device that controls the transmission/shielding (On/Off of display) of light by controlling the alignment of liquid crystal molecules having birefringence. Generally, the liquid crystal molecules are initially aligned, and then the alignment is changed by the application of voltage. Examples of the technique of initially aligning the liquid crystal molecules between substrates include a method of arranging an alignment film which is subjected to an alignment treatment such as rubbing method or photo-alignment method (photo-alignment technique) on the surface of the substrate that contacts the liquid crystal layer.

Such a liquid crystal display device has characteristics of low power consumption, a thin shape, and a high display performance. The liquid crystal display device is used for large-screen television, mobile phones, and the like, and has become indispensable in daily lives and businesses.

Incidentally, regarding alignment control of liquid crystal molecules, various display modes having diverse characteristics according to the arrangement of electrodes or driving method have been developed. For example, in a liquid crystal display device employing a display mode such as an In-Plane Switching (IPS) mode or a Fringe Field Switching (FFS) mode using a horizontal alignment film in which liquid crystal molecules are aligned approximately in a horizontal direction when voltage is not applied, the liquid crystal display device can exhibit the wide viewing angle characteristic.

In those various display modes, the method of alignment treatment for a substrate that determines the initial alignment of liquid crystal molecules is important for the display quality. However, if an alignment film is formed by rubbing, foreign substances are generated, or the alignment film is scratched. Accordingly, the display quality or the yield deteriorates in some cases. As a solution to the problem, weakening the rubbing strength can be considered. However, in this case, an alignment regulating force of the alignment film deteriorates, and this leads to a concern that the alignment may be disordered, or an image sticking may occur during liquid crystal display. The "image sticking" is a phenomenon in which when an image is displayed for a long time and then replaced with another image, the image having been displayed before the image replacement remains and is displayed.

On the other hand, the alignment treatment using the photo-alignment technique can impart the alignment regulating force to the film without contacting the film. Accordingly, the alignment film is not scratched, or foreign substances are not generated. However, the alignment film itself formed by the photo-alignment technique (hereinafter, also called a "photo-alignment film") has weak alignment regulating force. Therefore, in this film, disordered alignment or image sticking is observed in some cases similarly to the alignment film formed by weakened rubbing strength, so the film has not been commercialized.

In consideration of the above problems, a method of suppressing hysteresis in electro-optic characteristics, that is, a method of stabilizing liquid crystal arrangement by adding a photopolymerizable monomer to liquid crystals to form a liquid crystal display panel and then irradiating the panel with light to form a polymer has been proposed (for example, refer to Non-Patent Literatures 1 and 2).

Such a technique for stabilizing the alignment by using a polymer including a photopolymerizable monomer is also called a "Polymer Sustained Alignment (PSA) technique".

CITATION LIST

Non Patent Literature

Non-Patent Literature 1: Y. Nagatake (and 2 others), "Research on the Improvement of Hysteresis Characteristics of Optical alignment LCD Using Polymer Stabilization Technique", lecture proceedings of The Japanese Liquid Crystal Society Forum 2010, The Japanese Liquid Crystal Society, Aug. 27, 2010, lecture NO. 2b02

Non-Patent Literature 2: Y. Nagatake (and 1 more), "Hysteresis Reduction in EO Characteristics of Photo-Aligned IPS-LCDs with Polymer-Surface-Stabilized Method", IDW '10: proceedings of the 17th International Display Workshops, IDW '10 Publication committee, 2010, LCTp2-5, p. 89-92

SUMMARY OF INVENTION

Technical Problem

However, as a result of examination of the PSA technique of the related art that is disclosed in Non-Patent Literatures 1 and 2, the present inventors found that the technique has the following four problems when it is used for a liquid crystal display device which has been required to have a higher display performance and quality in recent years.

(1) If a photopolymerizable monomer is added to liquid crystals, the electro-optic characteristics of the liquid crystal display panel may shift greatly to a high-voltage side. Consequently, the transmissivity of the liquid crystal display panel may be reduced, or power consumption may be increased due to the increase in the driving voltage. This can be confirmed from, for example, FIG. 4 disclosed in Non-Patent Literature 1.

Moreover, the technique also has problems including (2) reduction in contrast, (3) insufficient characteristics of image sticking, and (4) poor electric characteristics such as a voltage holding ratio and residual DC and lack of long-term reliability.

An object of the present invention is to provide a liquid crystal display device that includes a horizontal alignment film, stabilizes liquid crystal alignment by the PSA technique, can suppress the increase in power consumption, reduction in contrast, and image sticking in display, and has long-term reliability.

Solution to Problem

As a result of thorough examination of the cause of the problems described in the above (1) to (4), the present inventors found that in the liquid crystal display panel disclosed in Non-Patent Literature 1, the problems described in the above (1) to (3) are caused because the size of the polymer is large, and the polymer forms a network structure not on the surface of the alignment film but in the entire liquid crystal layer.

That is, due to the polymer that is not adjacent to the alignment film and is present in bulk, the fixation of the liquid crystal alignment and the reduction in voltage effectively applied to the liquid crystal cause the shift to a high-voltage side as (1). Moreover, since the polymer is formed throughout the entire liquid crystal layer, light is scattered at the time of black display during which voltage is not applied, whereby the reduction in contrast as (2) is caused. In addition, because it is impossible to selectively fix liquid crystal alignment on the surface of the alignment film, the image sticking as (3) is caused.

Furthermore, the present inventors found that an unreacted material remaining in the liquid crystals, particularly, a polymerization initiator for polymerizing the photopolymerizable monomer is the cause of the problem (4) described above.

From the above results, the present inventors found that in order to solve the problems (1) to (3), it is necessary to suppress the formation of the bulky polymer by actively causing the polymer to be formed on the surface of the alignment film. As a method for doing this, the following method is considered. In this method, the concentration of the polymerization initiator is heightened to increase the density of polymerization starting points in the liquid crystal display panel, and the size of the polymer formed by light irradiation is reduced to cause the polymer to be rapidly precipitated from the liquid crystal layer, whereby the polymer is deposited onto the surface of the alignment film. However, heightening the concentration of the polymerization initiator is not preferable since doing such thing further negatively affects the electric characteristics of (4) described above.

As a result of further thorough examination, the present inventors found that if a polymerization-initiating function is imparted to the monomer without adding a polymerization initiator to the liquid crystals, the polymerization initiator which may become an impurity does not remain in the liquid crystals, so the electric characteristics are markedly improved. The present inventors also found that if the monomer itself has a polymerization-initiating function, the density of polymerization starting points in the liquid crystal display panel increases, and accordingly, due to a precipitating effect resulting from the decrease in solubility of the monomer in the liquid crystal layer that is caused when the monomer becomes an oligomer-like substance, the monomer is rapidly deposited onto the surface of the alignment film, whereby an extremely uniform polymer layer can be formed on the surface of the alignment film. In this manner, the present inventors found that the above problems can be excellently solved, thereby completing the present invention.

That is, an aspect of the present invention is a liquid crystal display device (hereinafter, also called a "first liquid crystal display device of the present invention") including a pair of substrates, a liquid crystal layer interposed between the pair of substrates, a horizontal alignment film formed on at least one of the pair of substrates, and a polymer layer formed on the horizontal alignment film, wherein the polymer layer has a structure represented by the following chemical formula (1) in a repeating unit.

[Chem. 1]

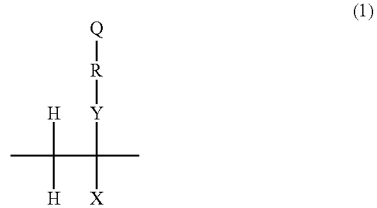

(1)

In chemical formula (1), X represents —H or —CH$_3$. Y represents —O—, —COO—, —CONH—, or a direct bond. R represents a divalent group including a benzene ring structure that is bonded at least to Y. Q represents a monovalent organic group.

The polymer layer has a function of controlling the alignment of the adjacent liquid crystal molecules. For example, the polymer layer may assist the function of the horizontal alignment film controlling an angle between the major axis of the liquid crystal molecule and the substrate surface, or may perform the same function as that of the horizontal alignment film.

In addition, from the same viewpoint as above, another aspect of the present invention is a liquid crystal display device (hereinafter, also called a "second liquid crystal display device of the present invention") including a pair of substrates, a liquid crystal layer interposed between the pair of substrates, a horizontal alignment film formed on at least one of the pair of substrates, and a polymer layer formed on the horizontal alignment film, wherein the polymer layer is formed by the polymerization of at least one or more kinds of monomers added to the liquid crystal layer, and at least one of the one or more kinds of monomers includes a structure in which the monomer itself generates radical by being irradiated with light.

The above chemical formula (1) represents an essential repeating unit (monomer unit) constituting a polymer layer that is formed by the PSA technique. In the present invention, as the monomer forming the repeating unit, it is preferable to use a monomer that is polymerized by functioning as a polymerization initiator for itself by being irradiated with light. In the present specification, such a monomer is also called an initiator function-imparted monomer. As such a monomer, a monomer including a structure in which an acryloyloxy group, a methacryloyloxy group, a vinyl group, a vinyloxy group, an acryloylamino group, or a methacryloylamino group is bonded to a benzene ring is preferable. By including a structure forming the repeating unit represented by the above formula (1), preferably, by including the structure including a benzene ring, the monomer can generate radical by being irradiated with light, as described in, for example, the following chemical reaction formula (6). This reaction is considered to be the same as the reaction in which the above functional group is cleaved to generate radical during the process of photo-Fries rearrangement. Moreover, as shown in the following chemical reaction formula (6), because of including a methacrylate group, the monomer can form a polymer by causing a radical polymerization reaction.

A monomer polymerized by light irradiation is generally called a photopolymerizable monomer. However, in the case of the monomer of the present invention, the photopolymerizable monomer itself generates radical and is polymerized, so a polymerization initiator is not necessary. Moreover, a polymerization initiator may be used in the PSA technique of the present invention, but in this case, the residual polymerization initiator affects the performance of liquid crystal display. Accordingly, it is preferable to use the polymerization initiator in a minimum amount as described later, and it is most preferable not to use the polymerization initiator. One of the technical significance of the present invention is that the PSA technique can be performed in this manner.

[Chem. 2]

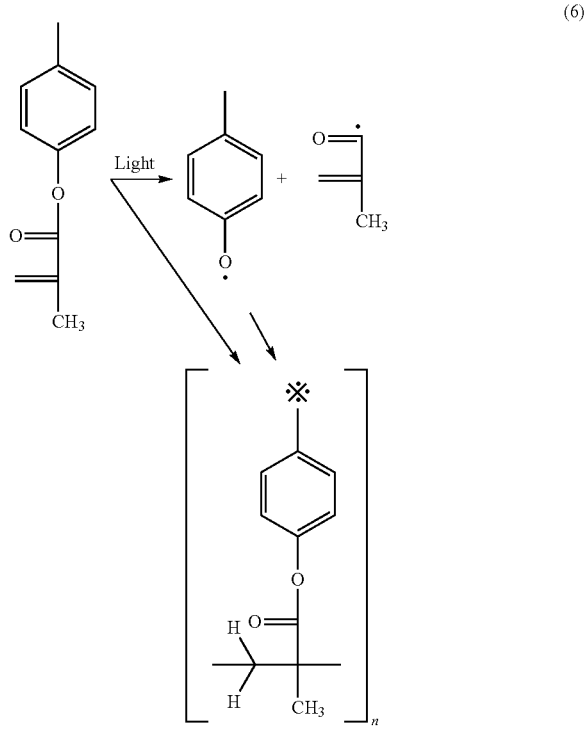

(6)

In chemical reaction formula (6), * represents any organic group. The same shall be applied hereinafter.

Moreover, the above chemical reaction formula represents an embodiment in which the initiator function-imparted monomer is cleaved by light and generates radical, and an embodiment in which a double bond in the monomer is polymerized and forms a repeating unit of the polymer.

In the present invention, the initiator function-imparted monomer refers to a monomer that generates radical and causes a polymerization reaction by being irradiated with ultraviolet rays and the like having approximately the same strength as that of the ultraviolet rays that are irradiated for causing a polymerization reaction of a monomer in the general PSA technique, or with visible light, even if there is no polymerization initiator generally used.

The pair of substrates included in the above respective liquid crystal display devices use, for example, one of the substrates as a Thin-Film Transistor (TFT) substrate and the other substrate as a counter substrate. If plural pixel electrodes are arranged on the thin-film transistor substrate, the alignment of liquid crystals can be controlled by a unit of pixel. In addition, if color filters of plural colors are arranged respectively in positions overlapping the pixel electrodes in the counter substrate, displayed color can be controlled by a unit of pixel. Moreover, the color filters may be formed not in the counter substrate but in the thin-film transistor substrate.

In the present invention, as a method of alignment treatment for the horizontal alignment film, rubbing treatment and photo-alignment treatment are exemplified. However, the horizontal alignment film is preferably an alignment film to which alignment-controlling function is imparted by the photo-alignment treatment. In the photo-alignment treatment, an alignment film can be formed in a non-contact manner. Accordingly, the photo-alignment treatment is superior to the rubbing treatment, in the respect that the alignment film is not scratched, and foreign substances are not generated.

The above respective liquid crystal display devices include the polymer layer that is formed on the alignment film and controls the alignment of the adjacent liquid crystals, and the polymer layer is formed by the polymerization of at least one or more kinds of monomers added to the liquid crystal layer. By the formation of the polymer layer, the alignment regulating force of the horizontal alignment film can be stabilized.

The repeating unit of the polymer constituting the polymer layer is not particularly limited as long as it includes the structure represented by the above chemical formula (1). That is, the polymer may be a homopolymer essentially including the repeating unit represented by the above chemical formula (1), or a copolymer copolymerized with another monomer. When the polymer is formed by the polymerization of plural kinds of monomers, plural repeating units may be arranged randomly, alternately, in a block, or the like.

The average molecular weight of the polymer constituting the polymer layer is not particularly specified, and may be approximately the same as the number average molecular weight or weight average molecular weight of the polymer formed by the general PSA technique. Typically, the average molecular weight is desirably 8 or more in terms of the number of repeating unit, or 1,000 or more in terms of the molecular weight.

The configuration of the above respective liquid crystal display device is not particularly limited by other components as long as it essentially includes such components.

Preferable embodiments of the above respective liquid crystal display device are mentioned in more detail below. The following embodiments may be employed in combination.

In the first liquid crystal display device of the present invention, R in the chemical formula (1) preferably includes a structure selected from the following chemical formula group (2). If a rod-like skeleton that is similar to a rod-like liquid crystal molecule and has high affinity with the liquid crystal molecule is included in the repeating unit, the solubility of the monomer in the liquid crystal can be improved, and the alignment regulating force of the horizontal alignment film can be further enhanced.

[Chem. 3]

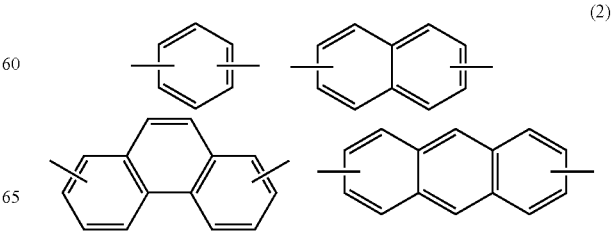

(2)

-continued

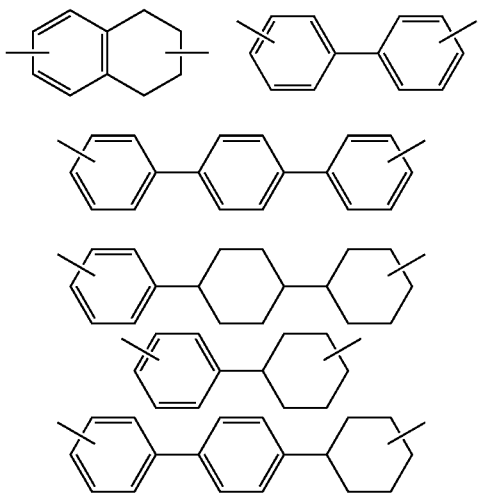

In chemical formula group (2), a portion or all of hydrogen atoms may be substituted with a halogen atom. In addition, the respective ring structure may be a hetero ring in which a carbon atom is substituted with another atom.

In the first liquid crystal display device of the present invention, the polymer layer preferably includes a structure represented by the following chemical formula (3) or (4) in a repeating unit.

[Chem. 4]

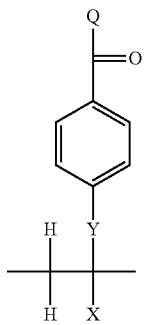
(3)

[Chem. 5]

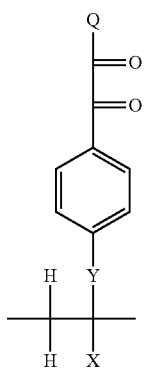
(4)

In chemical formulae (3) and (4), X represents —H or —CH$_3$. Y represents —O—, —COO—, —CONH—, or a direct bond. Q represents a monovalent organic group.

That is, in the first liquid crystal display device of the present invention, the polymer layer preferably includes a benzoyl skeleton. A monomer including a benzoyl skeleton generates radical by a hydrogen-atom abstraction reaction, as described in the following chemical reaction formula (7). Therefore, this monomer is more likely to generate radical, compared to a monomer including a non-benzoyl skeleton. Accordingly, the polymerization time taken for forming the polymer layer can be shortened, and a dense polymer layer can be formed.

[Chem. 6]

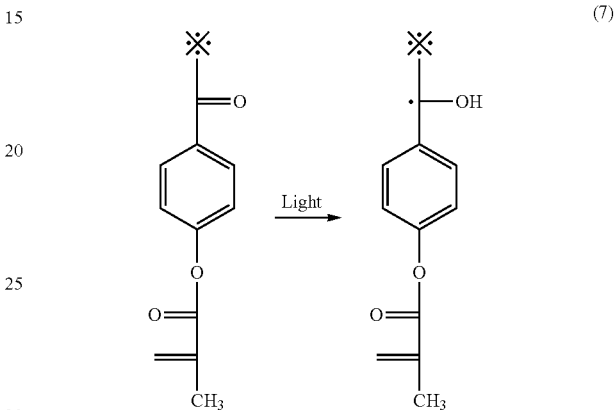
(7)

In the first liquid crystal display device of the present invention, Q in the chemical formula (1) preferably includes a benzene ring structure that is bonded to the R moiety. In this manner, it is possible to make the rod-like skeleton in the repeating unit become further similar to the rod-like skeleton of the liquid crystal molecule. As a result, affinity between the monomer skeleton and the liquid crystal molecule is improved, whereby the formed polymer layer can obtain an enhanced ability to fix the liquid crystal alignment. Moreover, though liquid crystals are sealed within a panel in vacuum in general, when the monomer has a low molecular weight, there is a concern that the concentration of the monomer will be reduced or become uneven due to volatilization of the monomer. If a benzene ring is introduced, the molecular weight can be increased, and the volatility can be reduced.

In the first liquid crystal display device of the present invention, Q preferably includes a polymer chain. In this manner, the polymer layer can form a dense 3-dimensional structure, and accordingly, the ability to fix the liquid crystal alignment can be enhanced.

In the first liquid crystal display device of the present invention, the polymer layer is preferably formed from a bifunctional monomer, and more preferably includes at least one kind of structure selected from the following chemical formula group (5) in a repeating unit. In this manner, the density of polymerization starting points in the liquid crystal display panel can be further increased. In addition, when radical is generated by causing the cleavage as described in the above reaction formula (6), if the monomer is a bifunctional monomer, each of the cleaved moieties includes a polymerization reaction group. Therefore, it is possible to suppress that unreacted materials remain in the liquid crystal.

[Chem. 7]

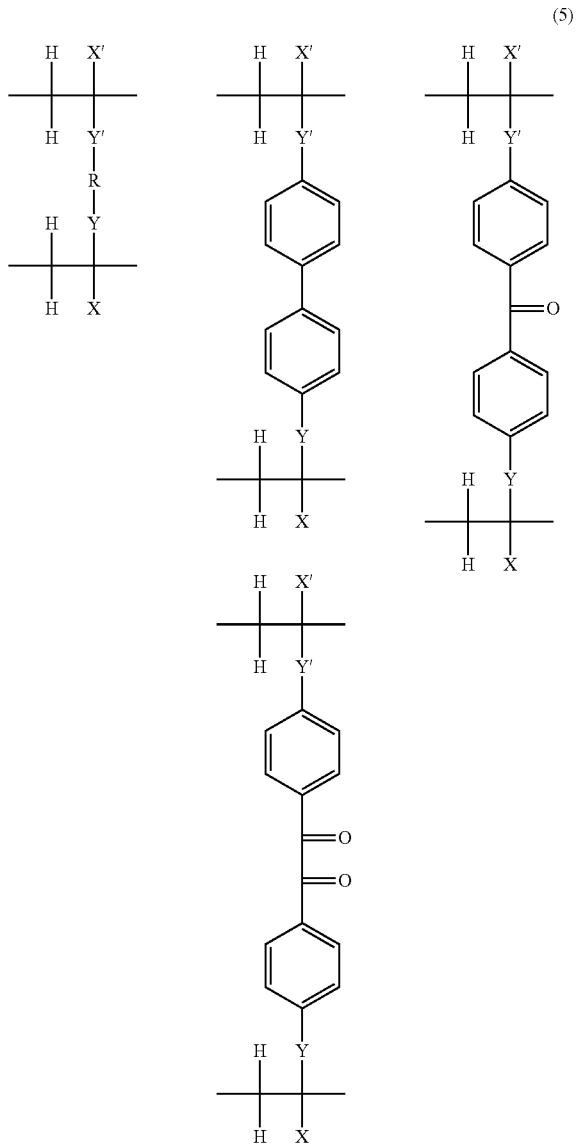

(5)

In chemical formula group (5), each of X and X' independently represents —H or —CH$_3$. Each of Y and Y' independently represents —O—, —COO—, —CONH—, or a direct bond.

In the first and second liquid crystal display devices of the present invention, the horizontal alignment film is preferably an alignment film (horizontal photo-alignment film) to which the alignment-controlling function is imparted by photo-alignment treatment. The photo-alignment treatment is more effective compared to other alignment treatment such as rubbing treatment, in the respect that foreign substances are not generated, and the alignment film itself is not scratched. The horizontal photo-alignment film is a polymer film that obtains anisotropy by being irradiated with polarized light or unpolarized light and has a property of controlling the liquid crystal alignment. In a more preferable embodiment, the horizontal photo-alignment film is a photo-alignment film which is subjected to the photo-alignment treatment by either or both of ultraviolet rays and visible rays. The size of a pretilt angle that is imparted to the liquid crystal molecules by the horizontal photo-alignment film can be adjusted by the type of light, the time of light irradiation, the direction and intensity of irradiation, the type of photo-functional group, and the like. Moreover, in the liquid crystal display device of the present invention, the above polymer layer is formed, and as a result, the alignment can be fixed. Consequently, after the production process of the liquid crystal display device of the present invention ends, it is not necessary to prevent ultraviolet rays or visible rays from entering the liquid crystal layer, whereby the range of choice in the production process is widened. In addition, the horizontal photo-alignment film may have a property of aligning liquid crystals to be vertical to the polarized light emitted thereto. In this case, if the film is irradiated with p-polarized light in a normal line direction of the substrate or direction diagonal to the substrate, the pretilt angle becomes 0° in general.

The horizontal alignment film material (material forming the horizontal alignment film) may be a single polymer or a mixture including other molecules, as long as the material has the above properties. For example, the material may be in the form in which a polymer including a functional group that enables the photo-alignment contains other low-molecular weight molecules such as additives or other photo-inactive polymers. As the horizontal alignment film material, materials causing a photodecomposition reaction, a photoisomerization reaction, or a photodimerization reaction are selected in general. Generally, in the photoisomerization reaction and photodimerization reaction, liquid crystals can be aligned by irradiation of a smaller amount of light of a longer wavelength compared to the photodecomposition reaction. Therefore, these reactions have more excellent productivity compared to the photodecomposition reaction. That is, it is preferable that the alignment film material forming the horizontal alignment film includes a functional group that can cause the photoisomerization or photodimerization type of photoreaction. More specifically, in the first and second liquid crystal display devices of the present invention, it is preferable that of alignment film material forming the horizontal alignment film includes a photoreactive functional group, and the photoreactive functional group is preferably at least one kind of functional group selected from a group consisting of a cinnamoyl group, a diarylethene group (a functional group including a chemical structure of diarylethene), an anthrylene group, a chalcone group, a coumarin group, a cinnamate group, an azobenzene group, and a stilbene group. These photoreactive functional groups can be relatively easily formed on a side chain of a polymer, and exhibit excellent reactivity during the photo-alignment treatment. More specifically, these photoreactive functional groups can receive radical by photoexcitation. Accordingly, they can contribute to the acceleration of the polymerization reaction of the polymer layer and to the uniform formation of the polymer layer.

Moreover, the photoreactive functional group may be appropriately modified with a modifying group. For example, a benzene ring of the cinnamate group may be modified with at least one kind of group selected from a group consisting of fluorine, an alkyl group, an alkoxy group, a benzyl group, a phenoxy group, a benzoyl group, a benzoate group, and a benzoyloxy group. In addition, a derivative of a monomer including the photoreactive functional group and a derivative of a monomer including the photoreactive functional group containing the modifying group may be used to form a polymer as the alignment film material. If the alignment film material containing the above modifying group or the alignment film material using the above derivative is used, the electric characteristics or alignment stability can be improved.

On the other hand, in the photodecomposition reaction, liquid crystals can be aligned with light of a lower wavelength in general, compared to the photoisomerization reaction and photodimerization reaction. Therefore, when the polymer layer is formed by using light of a high wavelength, the horizontal alignment film does not easily deteriorate. That is, in the horizontal alignment film, it is preferable that the alignment film material forming the horizontal alignment film includes a functional group that can cause the photodecomposition type photoreaction. More specifically, in the first and second liquid crystal display devices of the present invention, it is preferable that the alignment film material forming the horizontal alignment film includes a cyclobutane skeleton in a repeating unit. The alignment film material including a cyclobutane skeleton exhibits alignment-controlling function by the photodecomposition reaction. However, in this reaction, the light energy of the emitted light (ultraviolet rays) is great in general, and this leads to a concern that the main chain of the structure forming the alignment film, a color filter, and the like will also undergo photodecomposition, and the long-term reliability will impaired. On the other hand, in the present invention, the polymer layer can assist the alignment-controlling function of the horizontal alignment film. Consequently, the light energy of the light emitted to the alignment film material can be reduced relatively. Therefore, it is possible to suppress that the alignment film itself, a color filter, and the like are damaged by the light irradiation. Generally, in order to cause the reaction of a photodissociable monomer, light of a wavelength of around 254 nm is used. However, in the PSA technique, visible light of a wavelength of 313 nm or higher is usable. Accordingly, it can be considered that the horizontal alignment film formed by the photo-alignment treatment performed beforehand will not deteriorate by light irradiation. On the other hand, in order to cause the reaction of a photoisomerization type or photodimerization type photoreactive monomer, light of a wavelength of around 313 nm is used in general. Therefore, when a photoisomerization type or photodimerization type photoreactive photo-alignment film material (monomer) is used, it is necessary to pay attention to the irradiation energy and the like so that the horizontal alignment film itself does not deteriorate by light irradiation. In this respect, the photodissociable photo-alignment film material that includes a cyclobutane skeleton is advantageous.

In the first and second liquid crystal display devices of the present invention, a main component of the alignment film material that forms the horizontal alignment film is preferably polyimide, polyamic acid, polymaleimide, or polysiloxane. These are a polymer group that can be effectively used as an alignment film.

In the first and second liquid crystal display devices of the present invention, the liquid crystal display devices preferably employ an IPS mode or an FFS mode as a display mode. The present invention is suitable for the display mode that forms a horizontal electric field.

Liquid crystal display devices employing a Ferroelectrics Liquid Crystal (FLC) mode or an Anti-Ferroelectrics Liquid Crystal (AFLC) mode have a wide viewing angle and a high response speed, so research and development regarding the devices are being conducted. The above modes also essentially require the horizontal alignment of liquid crystal molecules. In the first and second liquid crystal display devices of the present invention, it is preferable that the liquid crystal display devices employ the FLC mode or the AFLC mode as a display mode.

In the first liquid crystal display device of the present invention, the polymer layer is formed from one or more kinds of monomers, similarly to the second liquid crystal display device of the present invention. In addition, in the first and second liquid crystal display devices of the present invention, examples of the one or more kinds of monomers forming the polymer layer include compounds represented by at least one kind of chemical formula selected from the following chemical formula groups (8) and (9).

[Chem. 8]

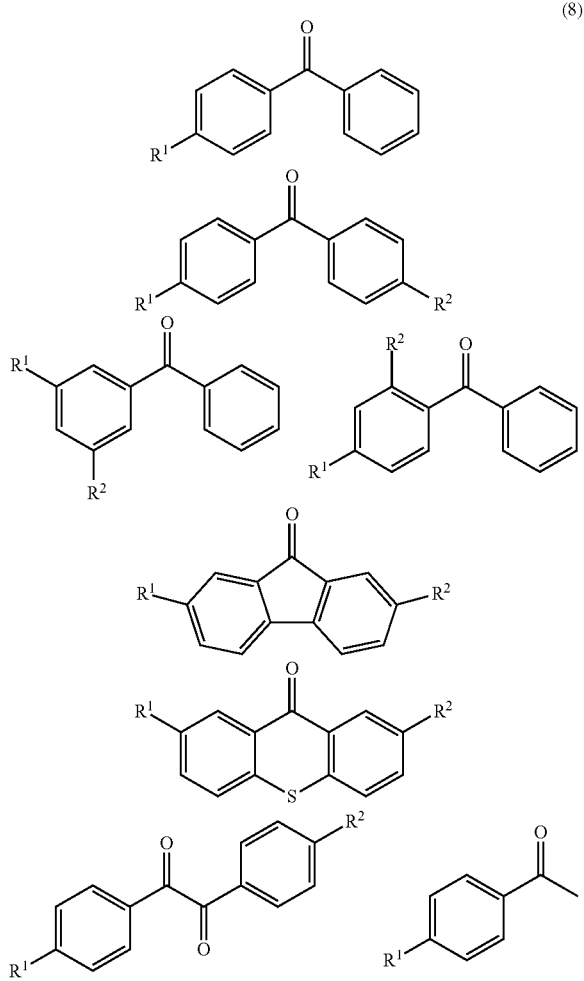

(8)

In chemical formula group (8), $R^1$ and $R^2$ are the same as or different from each other and represent a $-Sp^1-P^1$ group, a hydrogen atom, a halogen atom, a —CN group, a —NO$_2$ group, a —NCO group, a —NCS group, a —OCN group, a —SCN group, a —SF$_5$ group, or a linear or branched alkyl group, aralkyl group, or phenyl group including 1 to 12 carbon atoms. At least one of $R^1$ and $R^2$ includes a $-Sp^1-P^1$ group. $P^1$ represents a polymerizable group. $Sp^1$ represents a linear, branched, or cyclic alkylene group or alkyleneoxy group including 1 to 6 carbon atoms, or a direct bond. When at least one of $R^1$ and $R^2$ represents a linear or branched alkyl group, aralkyl group, or phenyl group including 1 to 12 carbon atoms, a hydrogen atom that at least one of $R^1$ and $R^2$ includes may be substituted with a fluorine atom, a chlorine atom, or a -Sp$^1$-P$^1$ group. A —CH$_2$— group that R$^1$ and R$^2$ include may be substituted with a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$OH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, as long as an oxygen atom, a sulfur atom, and a nitrogen atom are not adjacent to one another.

Examples of the P$^1$ include an acryloyloxy group, a methacryloyloxy group, a vinyl group, a vinyloxy group, an acryloylamino group, or a methacryloylamino group.

[Chem. 9]

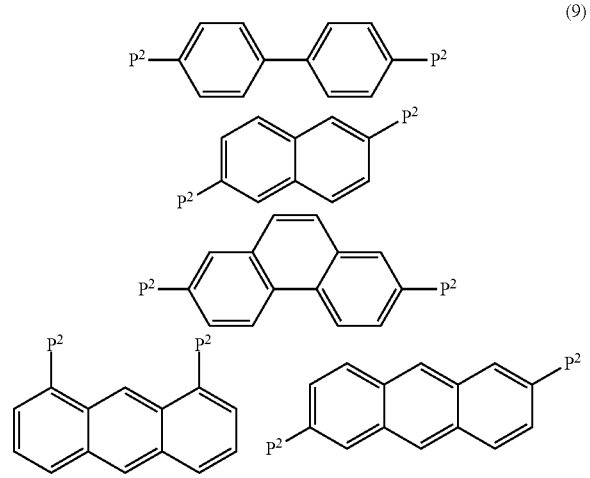

(9)

In chemical formula group (9), P$^2$s are the same as or different from each other and represent a polymerizable group.

Examples of the P$^2$ include an acryloyloxy group, a methacryloyloxy group, a vinyl group, a vinyloxy group, an acryloylamino group, or a methacryloylamino group.

All of the compounds represented by at least one kind of chemical formula selected from the chemical formula groups (8) and (9) are initiator function-imparted monomers. If the polymer layer is formed by using the initiator function-imparted monomer, the problems to be solved by the present invention can be solved.

Provided that the amount of liquid crystals (liquid crystals material) is 100% by mass, the concentration of the one or more kinds of monomer added is preferably 0.01% by mass to 2% by mass. If the concentration is less than 0.01% by mass, there is a concern that the polymer layer will be formed insufficiently. If the concentration exceeds 2% by mass, there is a concern that the monomer will remain in the liquid crystal layer without being polymerized, and the display quality will be reduced. The concentration is more preferably 0.1% by mass to 0.5% by mass.

As described above, in the present invention, it is most preferable that a polymerization initiator is not used in the PSA technique. However, the polymerization initiator may be used in a range that does not impair the effect of the present invention. In this case, provided that the amount of the liquid crystals (liquid crystals material) is 100% by mass, the upper limit of the amount of the polymerization initiator used is preferably 0.2% by mass or less, and more preferably 0.05% by mass or less.

In the first and second liquid crystal display devices of the present invention, the monomer that is polymerized by functioning as a polymerization initiator for itself (monomer including a structure in which the monomer itself generates radical) preferably includes a structure in which the monomer generates radical by being irradiated with visible light. In this manner, it is possible to prevent the alignment film itself, a color filter, and the like from being damaged by ultraviolet irradiation. Moreover, it is also possible to polymerize the monomer by using a light emitted from a backlight as visible light. Accordingly, it is not necessary to install the facility for polymerizing the monomer, whereby the production cost can be kept low.

In the first and second liquid crystal display devices of the present invention, it is preferable that the one or more kinds of monomers are two or more kinds, and include a first monomer that includes a structure in which the monomer itself generates radical by being irradiated with light and a second monomer that initiate a polymerization reaction by the radical generated by the first monomer. That is, the one or more kinds of monomers preferably include a first monomer that is polymerized by functioning as a polymerization initiator for itself by being irradiated with light, and a second monomer that is polymerized by using the first monomer as a polymerization initiator. In this manner, it is possible to use the monomer (second monomer) that does not function as the existing polymerization initiator as a material of the polymer layer, and therefore, this is extremely advantageous for obtaining desired alignment film and polymer layer. More specifically, if the type and amount of the first and second monomers added are adjusted appropriately, the rate of photopolymerization reaction can be adjusted, whereby the formation of polymer network can be further suppressed.

As the second monomer, monomers based on acrylate or diacrylate can be used. Monomers used in the general PSA technique can be used as these monomers. Regarding the proportion of the first and second monomers used, provided that the total amount of the first and second monomers is 100% by mass, the proportion of the first monomer is preferably 10% by mass or higher, in view of causing the operation performed by the first monomer to become sufficient. The proportion of the first monomer is more preferably 20% by mass or higher and further preferably 50% by mass or higher.

Moreover, from the same viewpoint as above, another aspect of the present invention is a production method of a liquid crystal display device, including a step of forming a liquid crystal layer by injecting a liquid crystal composition that contains a liquid crystal material and one or more kinds of monomers, between a pair of substrates in which at least one of the substrates includes a horizontal alignment film, and a step of forming a polymer layer that controls the alignment of liquid crystal molecules on the alignment film, by polymerizing at least one of the one or more kinds of monomers by irradiating the liquid crystal layer with light, wherein at least one of the one or more kinds of monomers is a monomer that is polymerized by being irradiated with light.

The production method of the above respective liquid crystal display devices according to the present invention is not particularly limited by other steps as long as these steps are essentially included. The production method may include other steps.

Advantageous Effects of Invention

According to the present invention, it is possible to provide a liquid crystal display device that includes a horizontal alignment film, stabilizes liquid crystal alignment by the PSA technique, can suppress the increase in power consumption, reduction in contrast, and image sticking in display, and has long-term reliability.

DESCRIPTION OF EMBODIMENTS

Figure 1:
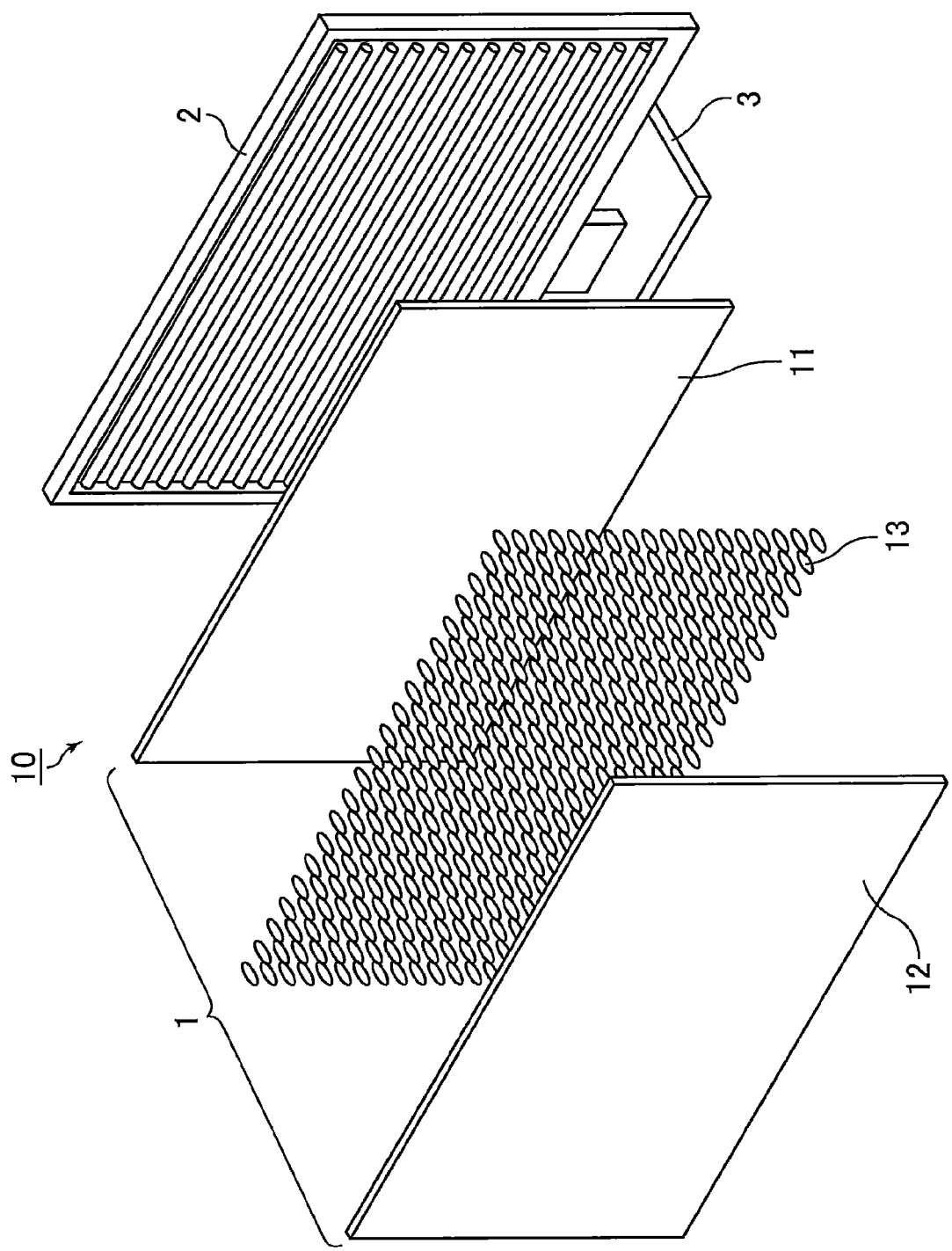
FIG. 1 is an exploded schematic perspective view of a liquid crystal television set of an embodiment according to the present invention.

The present invention will be mentioned in more detail referring to the drawings in the following embodiments, but is not limited to these embodiments.

The liquid crystal display device of the present invention and a liquid crystal display device prepared by the production method of the present invention can exhibit excellent display characteristics by being used in display devices such as a television, a personal computer, a mobile phone, and an information display.

In the present embodiment, a case where the liquid crystal display device of the present invention or a liquid crystal display device prepared by the production method of the present invention is applied to a television will be described. FIG. 1 is an exploded schematic perspective view of a liquid crystal television set of the present embodiment.

As shown in FIG. 1, a liquid crystal television set 10 of the present embodiment is constituted with a liquid crystal display panel 1, a backlight 2 that provides light to the liquid crystal display panel, and a platform 3 that supports the liquid crystal display panel 1 and the backlight 2. The liquid crystal display panel 1 includes a Thin-Film Transistor substrate (TFT substrate) 11, a Color Filter substrate (CF substrate) 12, and a liquid crystal layer 13 that is sealed between the TFT substrate 11 and the CF substrate 12. A polarizing plate is attached to the surface of the TFT substrate 11 that is opposite to the surface facing the liquid crystal layer 13. In addition, a polarizing plate (all of the polarizing plates are not shown in the drawing) is also attached to the surface of the CF substrate 12 that is opposite to the surface facing the liquid crystal layer 13. Moreover, a retarder may optionally be attached to the polarizing plate. In the back (the opposite side to the display surface of the liquid crystal display panel) of the liquid crystal display panel 1, the backlight 2 is arranged. In addition, in the side or back of the liquid crystal display panel 1, peripherals (not shown in the drawing) such as wiring and drivers for displaying a television image on a display screen are arranged.

The liquid crystal layer 13 is filled with a liquid crystal material having a characteristic in which the liquid crystal material is aligned in a specific direction when a certain degree of voltage is applied thereto. The alignment properties of liquid crystal molecules in the liquid crystal layer 13 are controlled by the application of voltage equal to or higher than a threshold value. The liquid crystal material filled in the liquid crystal layer 13 may have positive or negative anisotropy of dielectric constant.

Figure 2:
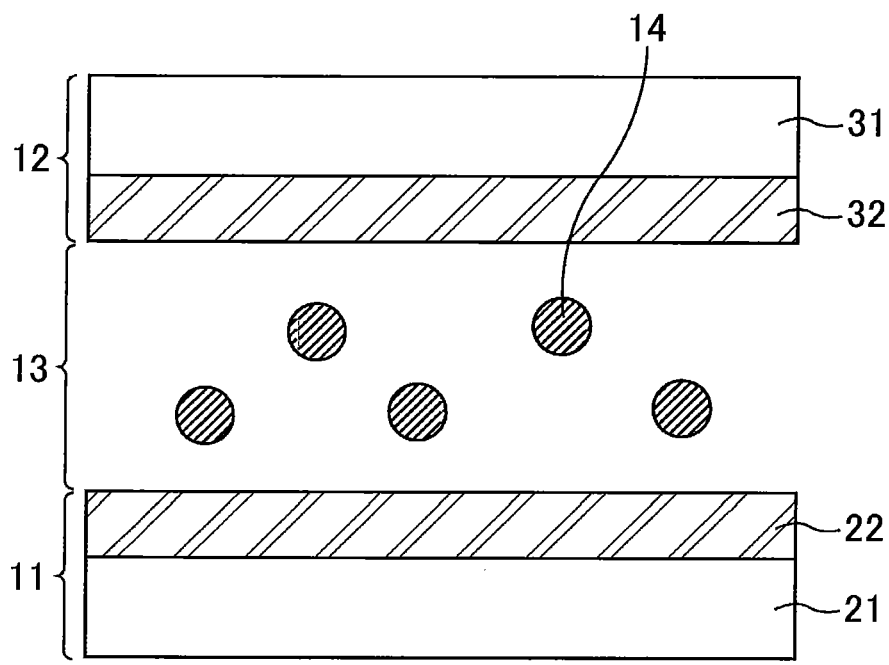
FIG. 2 is a schematic cross-sectional view of a liquid crystal display panel of an embodiment according to the present invention before a PSA polymerization step.
Figure 3:
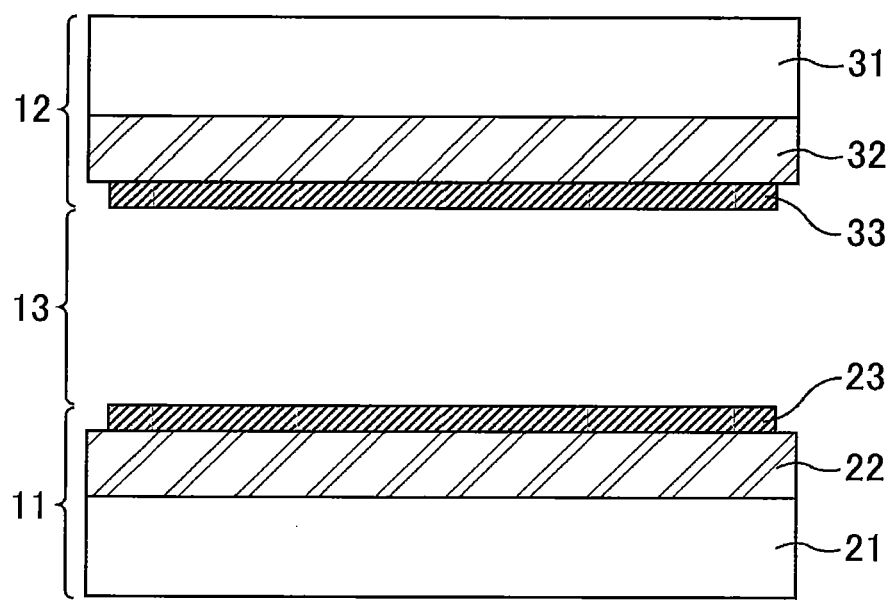
FIG. 3 is a schematic cross-sectional view of a liquid crystal display panel of an embodiment according to the present invention after a PSA polymerization step.

FIG. 2 is a schematic cross-sectional view of a liquid crystal display panel of the present embodiment, and shows the state before the polymerization (hereinafter, also called "PSA polymerization") step of the monomer added to the liquid crystal. FIG. 3 is a schematic cross-sectional view of a liquid crystal display panel of the present embodiment, and shows the state after the PSA polymerization step. The TFT substrate 11 includes an insulating transparent substrate 21 formed of a material such as glass, and various wirings, a pixel electrode, TFT, and the like formed on the transparent substrate 21. The CF substrate 12 includes an insulating transparent substrate 31 formed of a material such as glass, and a color filter, a black matrix, a common electrode, and the like formed on the transparent substrate 31.

The TFT substrate 11 includes a horizontal alignment film 22 in the surface contacting the liquid crystal layer, and the color filter substrate 12 includes a horizontal alignment film 32 in the surface contacting the liquid crystal layer. Examples of main components of the horizontal alignment films 22 and 32 include polymer materials such as polyimide, polyamic acid, polymaleimide, and polysiloxane. If alignment treatment such as rubbing treatment or photo-alignment treatment is performed on the surface of the horizontal alignment films 22 and 32, it is possible to specify the pretilt angle of the liquid crystal molecules so as to initially cause the liquid crystal molecules to slant in an approximately horizontal direction. As the photo-alignment material, materials containing compounds including a photoreactive functional group such as a chalcone group, a coumarin group, a cinnamate group, an azobenzene group, or a stilbene group are preferable. As the photo-alignment material, materials containing compounds including a cyclobutane skeleton are also preferable. Examples of the light used for the photo-alignment treatment include polarized UV, unpolarized UV, ion beams, and the like.

Figure 4:
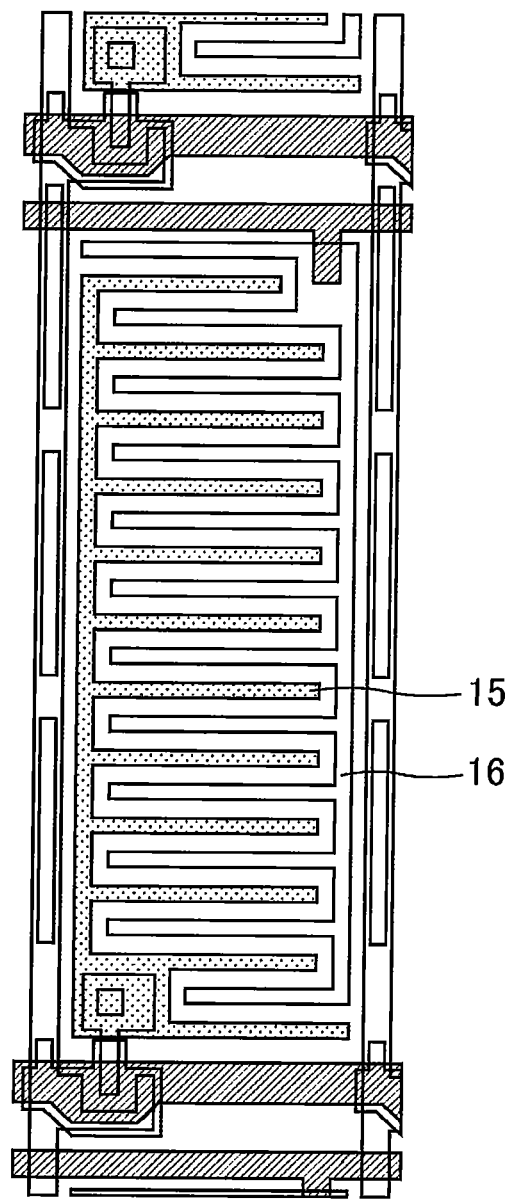
FIG. 4 is a schematic plan view of a liquid crystal display panel of an IPS mode of an embodiment according to the present invention.
Figure 5:
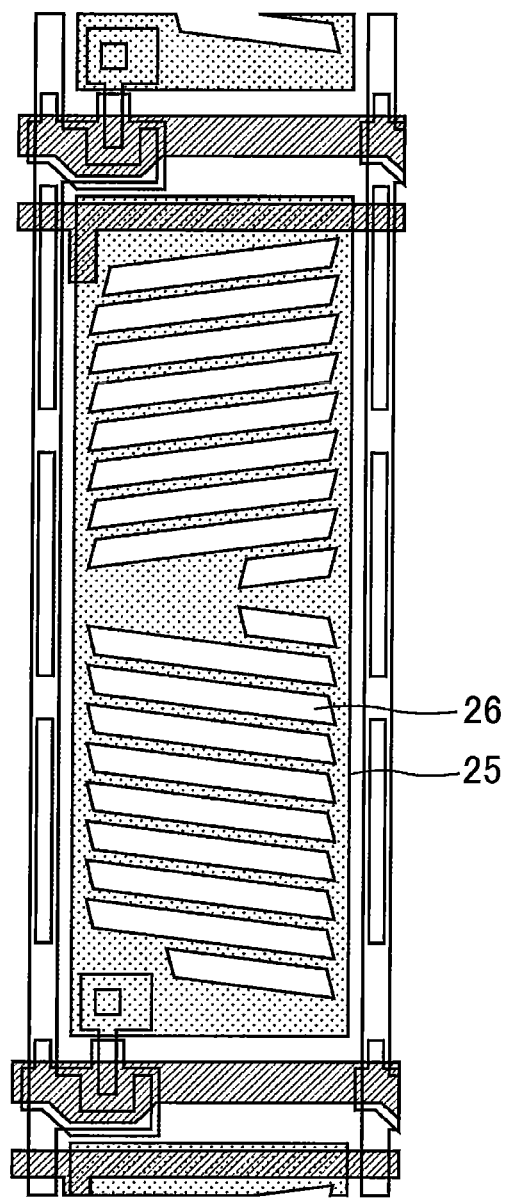
FIG. 5 is a schematic plan view of a liquid crystal display panel of an FFS mode of an embodiment according to the present invention.

Examples of the display mode including the horizontal alignment film include an IPS mode and an FFS mode. A liquid crystal display panel of the IPS mode includes, for example, a pixel electrode 15 and a common electrode 16 as a pair of combteeth-shaped electrodes, as shown in FIG. 4. Moreover, a liquid crystal display panel of the FFS mode includes, for example, a pixel electrode 25 that includes a longitudinal-shaped opening (slit) and a common electrode 26 formed in a planar shape, as shown in FIG. 5.

In the FFS mode, the pixel electrode 25 may be a combteeth-shaped electrode. Moreover, the pixel electrode 25 may be formed in a planar shape, and the common electrode 26 may be an electrode including a longitudinal-shaped opening or may be a combteeth-shaped electrode.

In the present specification, the combteeth-shaped electrode refers to an electrode including plural combteeth and a portion connected to the respective tips of one side of the plural combteeth. The shape of each combtooth is not limited to a linear shape.

The plural linear portions are generally arranged in parallel with each other. The plural linear portions may have a linear shape, or may be formed in a zigzag shape or a V shape.

Before the PSA polymerization step is performed, liquid crystal molecules and one or more kinds of monomers 14 are present in the liquid crystal layer 13. In addition, the monomers 14 start to be polymerized by the PSA polymerization step performed by light irradiation, whereby PSA layers (polymer layers) 23 and 33 are formed on the horizontal alignment films 22 and 32. Moreover, the PSA layers 23 and 33 are preferably formed on one surface of the horizontal alignment films 22 and 32 as shown in FIG. 3. More specifically, the PSA layers 23 and 33 are preferably formed densely with an approximately uniform thickness on one surface of the horizontal alignment films 22 and 32. In addition, the PSA layers 23 and 33 may be formed in a dot shape on the horizontal alignment films 22 and 32. That is, the PSA layers 23 and 33 may be formed in at least a portion of the surface of the horizontal alignment films 22 and 32, and even at this time, it is possible to suppress image sticking while uniformly maintaining the alignment regulating force that the horizontal alignment films 22 and 32 have. Further, the PSA layers 23 and 33 may be formed in at least a portion of the surface of the horizontal alignment films 22 and 32, in a network shape in the entire liquid crystal layer 13. However, in view of suppressing the increase in power consumption, the reduction in contrast, and image sticking in display, the portion where the PSA layers are formed in a network shape is preferably as small as possible.

As a specific procedure, first, a liquid crystal composition containing a liquid crystal material and one or more kinds of monomers 14 is injected between the TFT substrate 11 and the CF substrate 12. Subsequently, a polarizing plate is attached to the TFT substrate 11 and the CF substrate 12 respectively to prepare a liquid crystal display panel, and then the backlight 2 is arranged on the surface of the liquid crystal display panel 1 that is opposite to the display surface thereof. Thereafter, the liquid crystal layer 13 is irradiated with a certain amount of visible light emitted from the backlight 2, thereby polymerizing the monomers 14.

In the present embodiment, the light used in the PSA polymerization step is not particularly limited, and may be, for example, ultraviolet rays or visible light. Particularly, when visible light is used, deterioration or damage of the constitutional members such as the liquid crystal layer and the alignment film can be reduced greatly. Moreover, if visible light is used, the PSA polymerization step can be performed even after the polarizing plate and the backlight are arranged on the liquid crystal display panel. Accordingly, it is not necessary to newly prepare facilities as in the case of performing ultraviolet irradiation, and this greatly contributes to the improvement of efficiency of the production process and the cost reduction.

At least one of the monomers 14 used in the present embodiment causes a chemical reaction alone, can be polymerized by itself, and functions as an initiator for another monomer to cause the polymerization of another monomer. As an example of the polymerization reaction in the present embodiment, a chain polymerization reaction is exemplified in which the radical generated from an initiator function-imparted monomer by light irradiation becomes an active species, and polymerization is caused successively.

When the PSA polymerization step is performed in the present embodiment, there is no particular limitation on the application of voltage to the liquid crystal layer. However, in the case of the IPS or FFS mode, since the initially created horizontal alignment state needs to be fixed, it is preferable to apply a voltage equal to or lower than a threshold voltage at which the liquid crystals respond. In addition, a state where a voltage is practically not applied is more preferable.

Examples of the monomer that is polymerized by functioning as a polymerization initiator for itself by being irradiated with light include compounds represented by the above chemical formula group (8) and compounds represented by the above chemical formula group (9). When the compounds represented by the above chemical formula groups (8) and (9) are mixed with a liquid crystal material, another polymerization initiator does not need to be added thereto, and it is possible to initiate the polymerization reaction by performing only the light irradiation. Particularly, the compounds represented by the above chemical formula group (8) can initiate the polymerization reaction by being irradiated not with ultraviolet rays but with visible light. Accordingly, it is possible to prevent the alignment film itself, the color filter, and the like from being damaged by ultraviolet rays. Moreover, the monomer can be polymerized by using a light emitted from a backlight as visible light, so it is not necessary to make investment in new facilities.

In addition, the compounds represented by the above chemical formula groups (8) and (9) can generate radical by being irradiated with light, even if there is no initiator. Therefore, even if the compounds are used concurrently with other monomers known in the related art that do not cause polymerization reaction alone even being irradiated with light, such as monomers based on acrylate or methacrylate, the PSA layer can be formed. Further, if the monomers represented by the above chemical formula group (9) are used concurrently with the monomers represented by the above chemical formula group (8), it is possible to polymerize the monomers represented by the above chemical formula group (9) by irradiating the monomers not with ultraviolet rays but with visible light.

When the above monomers are polymerized, a polymer including a structure represented by the above chemical formula (1) in a repeating unit is formed, whereby the PSA layers 23 and 33 are formed.

In view of enhancing the alignment regulating force of the horizontal alignment films 22 and 32, it is preferable that R in the above chemical formula (1) includes a structure selected from the above chemical formula group (2).

Moreover, in view of increasing the probability that radical will be generated from the monomer, it is preferable that the PSA layers 23 and 33 include a structure represented by the above chemical formula (3) or (4) in a repeating unit.

Further, in view of further enhancing the alignment regulating force of the horizontal alignment films 22 and 32, it is preferable that Q in the above chemical formula (1) includes a benzene ring structure that is directly bonded to R.

In addition, in view of further strengthening the PSA layers 23 and 33, it is preferable that Q in the above chemical formula (1) includes a polymer chain.

Moreover, in view of further increasing the density of the polymerization starting points in the liquid crystal display panel, it is preferable that the PSA layers 23 and 33 are formed from a bifunctional monomer. It is more preferable that the PSA layers 23 and 33 include at least one kind of structure selected from the above chemical formula group (5) in a repeating unit.

If the PSA layers 23 and 33 are formed by using the above monomers, it is possible to provide a liquid crystal display device that includes a horizontal alignment film, stabilizes liquid crystal alignment by the PSA technique, can suppress the increase in power consumption, reduction in contrast, and image sticking in display, and has long-term reliability.

In embodiment 1, the TFT substrate and CF substrate are not particularly limited, and, for, example, those used in the related art can be used. The material of TFT element is not particularly limited, and, for example, amorphous silicon and the like widely used in the related art can be used. Moreover, for example, an oxide semiconductor showing a high mobility, such as Indium-Galium-Zinc-Oxygen (IGZO), can be used for the TFT element. The TFT element formed of IGZO is suitable for a high-resolution liquid crystal display device since it can be formed in a smaller size, compared to a TFT element formed of amorphous silicon. Accordingly, the TFT element formed of IGZO has drawn attention recently. On the other hand, when rubbing process is applied to such a liquid crystal display device, it is difficult to evenly perform the rubbing treatment on the high-resolution pixels since pile density of the rubbing cloth is limited, and this leads to a concern that the display quality will deteriorate. In this respect, the photo-alignment technique excellent in realizing uniform alignment can be regarded as being useful for commercializing liquid crystal display devices to which the TFT element using an oxide semiconductor such as IGZO is introduced.

However, on the other hand, there is a concern that the oxide semiconductor such as IGZO will cause shift of threshold characteristics of the semiconductor by the ultraviolet irradiation in the photo-alignment technique. The shift of the characteristics leads to the change in the characteristics of the TFT element of pixels and affects the display quality. Moreover, the shift of the characteristics also greatly affects a monolithic driver element that can be formed on a substrate by an oxide semiconductor showing a high mobility. Accordingly, the technique, which can minimize the amount of the irradiated ultraviolet rays of a short wavelength that is necessary for the photo-alignment as described in the present invention, can be regarded as being particularly useful for commercializing the oxide semiconductor such as IGZO.

The liquid crystal display device according to embodiment 1 may be in the form of Color Filter On Array in which a color filter is formed on the TFT substrate 11. In addition, the liquid crystal display device according to embodiment 1 may employ monochrome display or field sequential color system, and in this case, a color filter is not required. For a system requiring a high response speed, such as field sequential color system, IGZO described above is suitable.

If the portion of the liquid crystal display panel of the liquid crystal television set of the present embodiment is disassembled, and Gas Chromatography Mass Spectroscopy (GC-MS) of the liquid crystal composition is performed, the component, weight ratio, and the like of the residual monomer in the liquid crystal composition can be analyzed. Further, if Time-Of-Flight Secondary Ion Mass Spectrometry (TOF-SIMS) is performed on the surface of the alignment film, the component of the material used for the alignment film can be analyzed.

Example 1

In Example 1, a liquid crystal display panel of the FFS mode was actually prepared. A glass substrate including a planar electrode (common electrode) formed from Indium Tin Oxide (ITO) and a slit electrode (pixel electrode) in the stated order on the surface thereof was prepared and used as a TFT substrate. In addition, a glass substrate including a color filter and BM was prepared and used as a CF substrate. A polyamic acid solution that was used as an alignment film material and contained polyvinyl cinnamate as a photoreactive functional group was coated onto the entire surface of the respective substrates by spin coating. As the glass substrate, #1737 (produced by Corning CO., LTD.) was used. Thereafter, the respective substrates were left under a condition of 90° C. for 1 minute so that the coated solution was temporarily dried. Then the respective substrates were left in a nitrogen atmosphere under a condition of 200° C. for 40 minutes so as to burn the temporarily dried film.

Thereafter, as alignment treatment, the surface of the respective substrates was irradiated with polarized ultraviolet rays of a wavelength of 313 nm at a dosage of 100 mJ/cm$^2$, in a normal line direction of the respective substrates. In addition, the polarization direction of the polarized ultraviolet rays was set in an azimuth in which an angle of 80° was formed between the ultraviolet rays and the slit electrode of the TFT substrate. Moreover, when being bonded to the TFT substrate, the CF substrate was irradiated with the polarized ultraviolet rays so that the same polarization azimuth is created. In this manner, the alignment film material coated onto the substrates caused a photoisomerization reaction and a photodimerization reaction, whereby a horizontal alignment film having an alignment azimuth forming 10° with respect to the slit electrode was formed.

Subsequently, a thermosetting seal (HC1413FP: produced by Mitsui Chemicals, Inc.) was printed on one substrate by using a screen printing plate. In addition, beads (SP-2035: produced by SEKISUI CHEMICAL CO., LTD.) having a diameter of 3.5 µm were dispersed onto the other substrate. Thereafter, the arrangement of the pair of substrates was adjusted so that the polarization direction of the ultraviolet rays emitted thereto became orthogonal to each other in the respective substrates, and the substrates were bonded to each other.

Next, while being pressurized with a pressure of 0.5 kgf/cm$^2$, the bonded substrates were heated at 200° C. for 60 minutes in a furnace purged with nitrogen, thereby hardening the seal.

A liquid crystal composition containing a liquid crystal material having positive anisotropy of dielectric constant and a monomer for PSA was injected in vacuum into the cell (the combination of two substrates bonded to each other) prepared in the above method. The monomer was added in an amount of 0.5 wt % based on the weight of the liquid crystal material. In addition, as the liquid crystal material, a liquid crystal material having negative anisotropy of dielectric constant may be used. In this case, if the polarization direction of the polarized ultraviolet rays set in an azimuth forming 10°, the same result is obtained.

The inlet of the cell to which the liquid crystal composition was injected was blocked with an ultraviolet curable resin (TB3026E: produced by Threebond Co., Ltd.) and sealed by being irradiated with ultraviolet rays. The wavelength of the ultraviolet rays was 365 nm, and the pixel portion was shielding so as to be prevented from being affected by the ultraviolet rays as much as possible.

Thereafter, in order to remove the flow alignment of the liquid crystals, the cell was heated at 130° C. for 40 minutes, and realignment treatment was performed to create an isotropic phase of the liquid crystal layer.

Subsequently, a polarizing plate was attached to each of the pair of substrates, thereby completing a liquid crystal display panel of the FFS mode. The polarizing axes of the polarizing plates of both substrates were adjusted so that the polarizing axes became orthogonal to each other.

Figure 6:
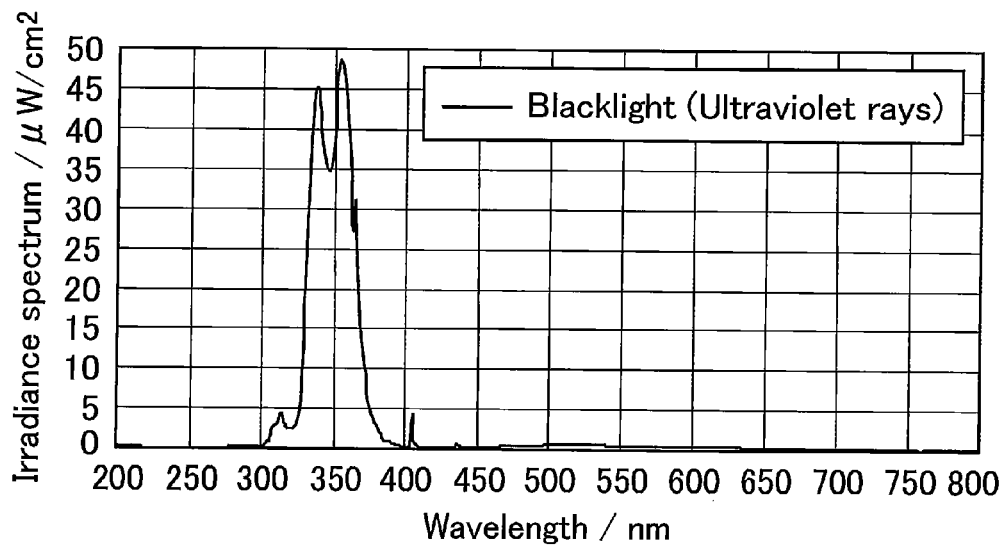
FIG. 6 is a graph showing an irradiance spectrum of a light source (blacklight) used in Example 1.

Next, in order to perform the PSA polymerization step on the liquid crystal display panel, in a state where voltage was not applied, the liquid crystal layer was irradiated with ultraviolet rays from blacklight having a wavelength of around 350 nm as a central wavelength, at a dosage of 2 J/cm$^2$. In this manner, the monomer in the liquid crystal layer was polymerized. A graph showing an irradiance spectrum of the blacklight is shown in FIG. 6.

In Example 1, a monomer represented by the following chemical formula (10) was used. The compound represented by the following chemical formula (10) is a biphenyl-based bifunctional methacrylate monomer.

[Chem. 10]

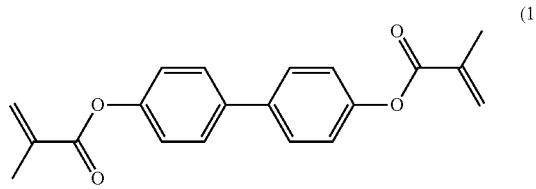

(10)

Figure 7:
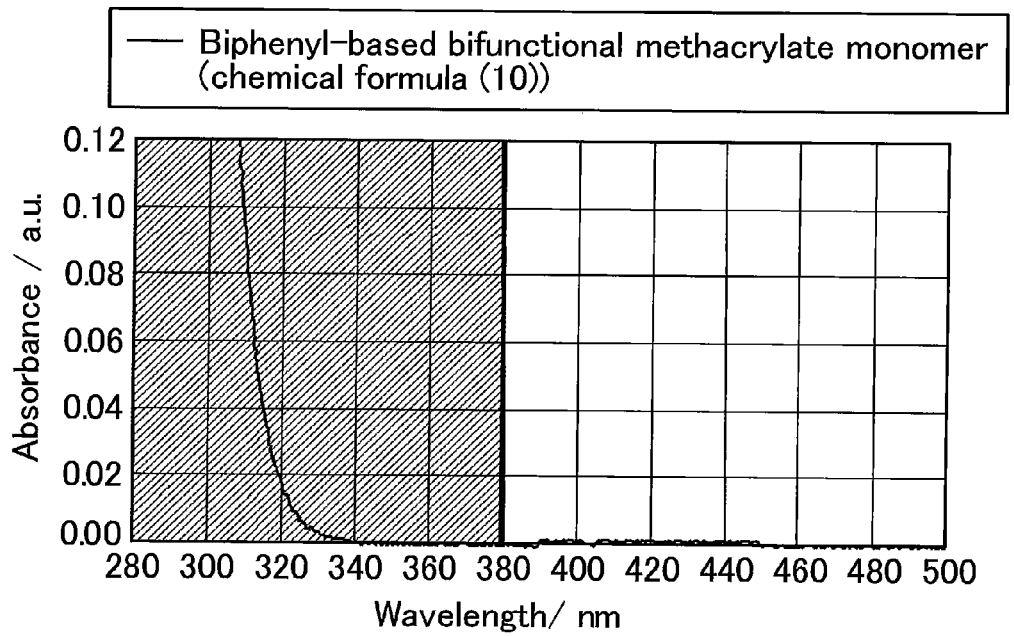
FIG. 7 is a graph showing an absorption spectrum of a monomer represented by a chemical formula (10).

FIG. 7 is a graph showing an absorption spectrum of a monomer represented by the above chemical formula (10). As shown in FIG. 7, the benzyl-based monomer represented by the above chemical formula (10) mainly absorbs light of a wavelength of 380 nm or shorter. Accordingly, when being irradiated with the ultraviolet rays, the monomer represented by the above chemical formula (10) generates radical as described in the following chemical formulae (11-1) and (11-2), and is polymerized by functioning as a polymerization initiator for itself.

[Chem. 11]

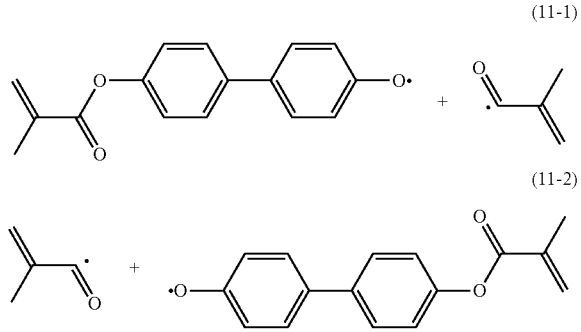

(11-1)

(11-2)

As the monomer, monomers based on naphthalene, phenanthrene, or anthracene can be used in addition to the biphenyl-based monomer. In addition, as the polymerizable group, an acryloyloxy group, a vinyl group, a vinyloxy group, an acryloylamino group, an acryloylamino group, or a methacryloylamino group can be used in addition to a methacryloyloxy group. The monomer including these polymerizable groups generate radical by the light of a wavelength ranging from about 300 nm to 380 nm. Therefore, the monomer can be polymerized by functioning as a polymerization initiator for itself.

The performance of the liquid crystal display panel according to Example 1 was evaluated. As a result, the increase in the driving voltage, the reduction in contrast, and the marked reduction in the voltage holding ratio were not observed. In addition, the image sticking thereof was evaluated. A luminance at 2 V (halftone) was measured in advance, and then V of white voltage was continuously applied. 6 hours later, a luminance at 2 V was measured again, and the rate of change was evaluated. The change itself is regarded as image sticking. When the liquid crystal display panel did not contain the monomer, the rate of change was 100% or higher. This means that the alignment regulating force of the alignment film itself is extremely weak. On the other hand, when the liquid crystal display panel contained the monomer and underwent the PSA step, the rate of change could be suppressed to be 5% or lower. That is, an exceptional image sticking-improving effect was obtained.

Example 2

In Example 2, a liquid crystal display panel of the IPS mode was actually prepared. A glass substrate including a pair of combteeth-shaped electrodes (a pixel electrode and a common electrode) formed of Indium Tin Oxide (ITO) on the surface thereof was prepared and used as a TFT substrate.

Thereafter, the liquid crystal display panel of the IPS mode was completed in the same manner as in Example 1, except that the monomer including a composition as described later was used. The polarizing axes of the polarizing plates of both substrates were adjusted so that the polarizing axes became orthogonal to each other.

Figure 8:
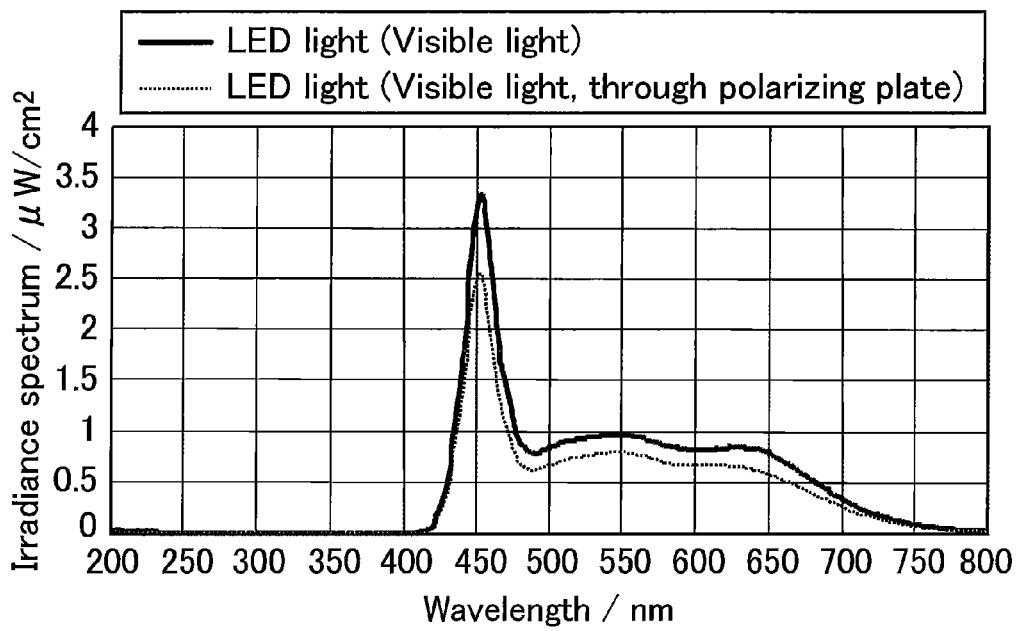
FIG. 8 is a graph showing an irradiance spectrum of a light source (LED light) used in Example 1.

Subsequently, in order to perform the PSA polymerization step on the liquid crystal display panel, in a state where voltage was not applied, the liquid crystal layer was irradiated with visible light from LED having a wavelength of around 450 nm at a dosage of 5 J/cm$^2$. In this manner, the monomer in the liquid crystal layer was polymerized. A graph showing an irradiance spectrum of the LED light is shown in FIG. 8.

In Example 2, the monomer represented by the following chemical formula (12) was mixed with the monomer represented by the following chemical formula (13) at a weight ratio of 50:50, and the mixture was added to the liquid crystal material in an amount of 0.5 wt % based on the weight of the liquid crystal material. The compound represented by the following chemical formula (12) is a benzyl-based bifunctional methacrylate monomer, and the compound represented by the following chemical formula (13) is a phenanthrene-based bifunctional methacrylate monomer.

[Chem. 12]

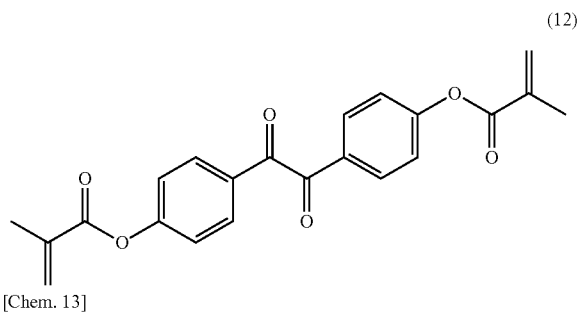

(12)

[Chem. 13]

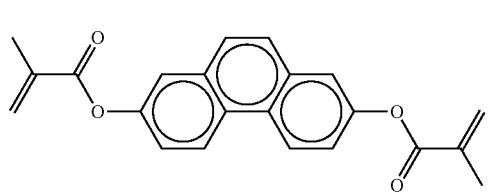

(13)

Figure 9:
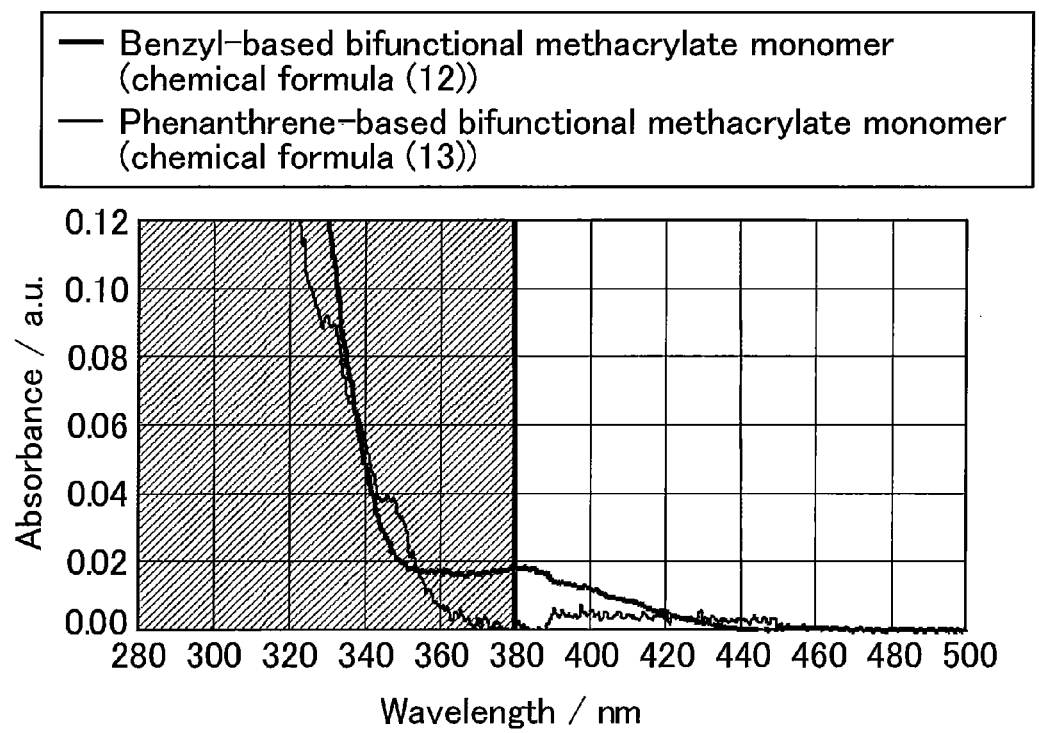
FIG. 9 is a graph showing an absorption spectrum of monomers represented by chemical formulae (12) and (13).

FIG. 9 is a graph showing an absorption spectrum of monomers represented by the above chemical formulae (12) and (13). In the present example, the PSA polymerization step is performed by using the LED light passing through the polarizing plate. Accordingly, light of a wavelength shorter than 380 nm is cut by the polarizing plate (left side of the boundary line of 380 nm in FIG. 9). As shown in FIG. 9, the benzyl-based monomer represented by the above chemical formula (12) absorbs light of a wavelength of 380 nm or longer. On the other hand, the phenanthrene-based monomer represented by chemical formula (13) practically does not absorb light of a wavelength of 380 nm or longer. Even in this case, in the present embodiment, the benzyl-based monomer represented by the above chemical formula (12) generates radical functioning as an active species, whereby the phenanthrene-based monomer represented by the above chemical formula (13) is polymerized. In addition, the benzyl-based monomer itself represented by the above chemical formula (12) is also polymerized by the radical, and constitutes a portion of the PSA layer.

As the monomer represented by the above chemical formula (12), monomers based on benzoin ether, acetophenone, benzyl ketal, or ketone that generate radical by photocleavage or hydrogen abstraction can also be used. Moreover, as a polymerizable group imparted to these, an acryloyloxy group, a vinyl group, a vinyloxy group, an acryloylamino group, an acryloylamino group, or a methacryloylamino group can be used in addition to a methacryloyloxy group. The monomer including these polymerizable groups absorb light of a wavelength of 380 nm or longer and generate radical. That is, the monomer can be polymerized by functioning as a polymerization initiator for itself by being irradiated with visible light.

The performance of the liquid crystal display panel according to Example 2 was evaluated. As a result, the increase in the driving voltage, the reduction in contrast, and the marked reduction in the voltage holding ratio were not observed. Further, an exceptional image sticking-improving effect was obtained. Particularly, by employing two-component system, the rate of the polymerization reaction and the rate of the formation of the polymer layer on the alignment film could be optimized. It is considered that for this reason, the formation of a polymer network in the liquid crystal cell could be further suppressed. Moreover, presumably, since the PSA polymerization was performed by using not ultraviolet rays but visible light, the long-term reliability of the liquid crystal display panel of Example 2 might be further improved compared to the liquid crystal display panel of Example 1. Further, even if light irradiation for PSA polymerization is sufficiently performed, the wavelength of the light is greatly different from the sensitivity wavelength (ultraviolet rays) of the photo-alignment film, and accordingly, the photo-alignment state is not damaged.

In Examples 1 and 2, polyvinyl cinnamate was used as the alignment film material. However, materials including a chalcone group, a coumarin group, a stilbene group, an azobenzene group, or the like as a photoreactive functional group can also be used. In addition, polyamic acid, polyimide that is partially or completely imidized, polyamide, siloxane, polymaleimide, and the like can also be used. Moreover, the photoreactive functional group may be appropriately modified with a modifying group. For example, a benzene ring of a cinnamate group may be modified with at least one kind of group selected from a group consisting of fluorine, an alkyl group, an alkoxy group, a benzyl group, a phenoxy group, a benzoyl group, a benzoate group, and a benzoyloxy group. Further, a derivative of the monomer as the alignment film material including the above photoreactive functional group, and a derivative of the monomer as the alignment film material including the above photoreactive functional group containing the above modifying group may be used. If the monomer containing the above modifying group or the above derivative is used, the electric characteristics or alignment stability can be improved.

In Examples 1 and 2, as alignment treatment, the respective substrates were irradiated with polarized ultraviolet rays at a dosage of 100 mJ/cm$^2$. However, it was confirmed that even with the irradiation energy equal to or smaller than the above, the polymer was sufficiently polymerized, and the alignment stabilization was accomplished. In view of suppressing deterioration caused by the ultraviolet irradiation, the smaller irradiation energy is more preferable. Specifically, it was confirmed that the alignment stabilization was accomplished even at a dosage of 10 mJ/cm$^2$.

Example 3

In Example 3, a liquid crystal display panel of the IPS mode was actually prepared. A cell was completed in the same manner as in Example 2, except that the alignment film material and the condition of the alignment treatment as described later were used.

As the alignment film material, a polyimide solution including a cyclobutane skeleton was used. The alignment film material was coated onto the substrate and dried in the same manner as in Example 1.

As alignment treatment, the surface of the respective substrates was irradiated with polarized ultraviolet rays of a wavelength of 254 nm at a dosage of 500 mJ/cm$^2$, in a normal line direction of the respective substrates. In addition, the polarization direction of the polarized ultraviolet rays was set in an azimuth in which an angle of 80° was formed between the ultraviolet rays and the slit electrode. In this manner, the alignment film material coated onto the substrate caused a photodecomposition reaction, whereby a horizontal alignment film was formed.

Thereafter, in the same manner as in Example 1, a liquid crystal compound obtained by adding the monomer represented by the above chemical formula (10) to the liquid crystal material in an amount of 0.5 wt % based on the weight of the liquid crystal material was sealed in the cell, thereby completing the liquid crystal display panel of the IPS mode. As the monomer, the monomers represented by the above chemical formulae (12) and (13) may be used instead of the monomer represented by the above chemical formula (10), in the same manner as in Example 2.

The performance of the liquid crystal display panel according to Example 3 was evaluated. As a result, the increase in the driving voltage, the reduction in contrast, and the marked reduction in the voltage holding ratio were not observed. Moreover, an exceptional image sticking-improving effect was obtained.

Comparative Example 1

A liquid crystal display device of the IPS mode was prepared in the same manner as in Example 3, except that the monomer represented by the above chemical formula (10) was not added into the liquid crystal material, and the PSA polymerization was not performed.

The performance of the liquid crystal display panel according to Comparative example 1 was evaluated. As a result, it was confirmed that sufficient alignment characteristics were not obtained. Presumably, this may be because photodecomposition of the alignment film material was insufficient. It is considered that in order to form an alignment film having sufficient alignment characteristics by using the alignment film material including a cyclobutane skeleton without performing PSA polymerization, ultraviolet irradiation at a dosage of about 2 $J/cm^2$ needs to be performed. However, if doing so, photodecomposition is also caused in other portions of the alignment film and the color filter, and this leads to a concern that the long-term reliability will be impaired. On the other hand, in the liquid crystal display panel of Example 3, it was confirmed that due to the action of the PSA layer, sufficient alignment characteristics are obtained even if ultraviolet irradiation is performed in such a degree that a problem does not arise in the long-term reliability.

Example 4

In Example 4, a liquid crystal display panel of the IPS mode was actually prepared. A cell was completed in the same manner as in Example 3, except that the method of alignment treatment as described later was used.

As alignment treatment, rubbing treatment was performed on the surface of the respective substrates. The surface was rubbed 3 times with a rubbing cloth of which the pile was allowed to be pushed into the substrate by 0.5 mm. In this manner, a horizontal alignment film was formed on the substrate.

Thereafter, a liquid crystal compound obtained by adding the monomers represented by the above chemical formulae (12) and (13) to the liquid crystal material in an amount of 0.5 wt % based on the weight of the liquid crystal material, was sealed in the cell in the same manner as in Example 2, thereby completing the liquid crystal display panel of the IPS mode. In addition, as the monomer, the monomer represented by the above chemical formula (10) may be used instead of the monomers represented by the above chemical formulae (12) and (13), in the same manner as in Example 1.

The performance of the liquid crystal display panel according to Example 4 was evaluated. As a result, the increase in the driving voltage, the reduction in contrast, and the marked reduction in the voltage holding ratio were not observed. Moreover, an exceptional image sticking-improving effect was obtained.

Comparative Example 2

A liquid crystal display device of the IPS mode was prepared in the same manner as in Example 4, except that the monomers represented by the above chemical formulae (12) and (13) were not added to the liquid crystal material, and PSA polymerization was not performed.

The performance of the liquid crystal display panel according to Comparative example 2 was evaluated. As a result, sufficient alignment regulating force was not obtained, and image sticking was caused markedly. Presumably, this may be because the rubbing strength in the alignment treatment was insufficient. It is considered that in order to form an alignment film having sufficient alignment characteristics by using the alignment film material including a cyclobutane skeleton without performing PSA polymerization, the pile of the rubbing cloth needs to be allowed to be pushed into the substrate by 0.6 mm, and the substrate needs to be rubbed about 5 times so as to increase the rubbing strength. However, doing so results in a concern that the stripe unevenness will cause in the alignment film due to scratch. Moreover, there is a concern that the rubbing cloth or peeled alignment film will become a foreign substance and be mixed into the liquid crystal display panel, and deteriorate the yield. On the other hand, in the liquid crystal display panel of Example 4, it was confirmed that due to the action of the PSA layer, sufficient alignment characteristics was obtained even with a rubbing strength in such a degree that the stripe unevenness and foreign substances were not caused in the alignment film.

The present application claims priority to Patent Application Nos. 2010-231924 filed in Japan on Oct. 14, 2010, 2011-084755 filed in Japan on Apr. 6, 2011, and 2011-177293 filed in Japan on Aug. 12, 2011 under the Paris Convention and provisions of national law in a designated State, the entire contents of which are hereby incorporated by reference.

REFERENCE SIGNS LIST

1: Liquid crystal display panel
2: Backlight
3: Platform
10: Liquid crystal television set
11: Thin-Film Transistor (TFT) substrate
12: Color Filter (CF) substrate
13: Liquid crystal layer
14: Monomer
15, 25: Pixel electrode
16, 26: Common electrode
21, 31: Transparent substrate
22, 32: Horizontal alignment film
23, 33: PSA layer (polymer layer)

The invention claimed is:
1. A liquid crystal display comprising:
a pair of substrates;
a liquid crystal layer interposed between the pair of substrates;
a horizontal alignment film formed on at least one of the pair of substrates; and
a polymer layer formed on the horizontal alignment film, wherein the polymer layer is formed by the polymerization of at least two or more kinds of monomers added into the liquid crystal layer,
at least one monomer of said two or more kinds of monomers have a structure that generates a radical when irradiated with visible light,
said two or more kinds of monomers include the following first and second monomers
first monomer

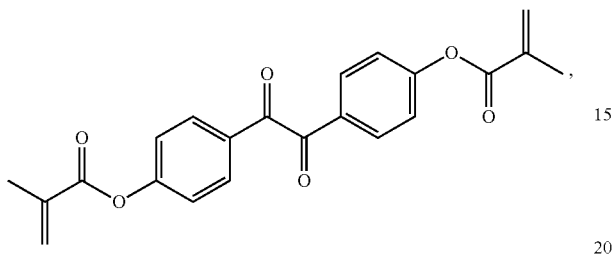

and second monomer

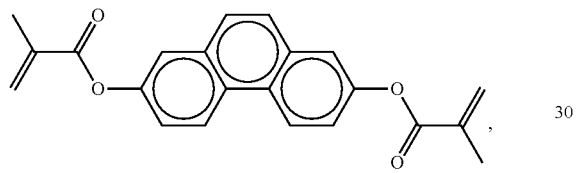

the horizontal alignment film is an alignment film to which an alignment-controlling function is imparted by photo-alignment treatment, and
an alignment film material that forms said horizontal alignment film includes a photoreactive functional group, and the photoreactive functional group is at least one kind of functional group selected from a group consisting of a cinnamoyl group, a diarylethene group, an anthrylene group, a chalcone group, a coumarin group, a cinnamate group, an azobenzene group, and a stilbene group,
wherein the polymer layer, in addition to structures formed by said first and second monomers, has a structure represented by the following chemical formula (1) in a repeating unit,

[Chem. 1]

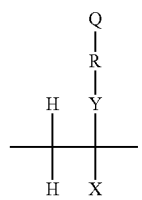

(1)

in chemical formula (1), X represents —H or —CH$_3$, Y represents —O—, —COO—, —CONH—, or a direct bond, Q represents a monovalent organic group, and R represents a divalent group that includes a structure selected from the following chemical formula group (2),

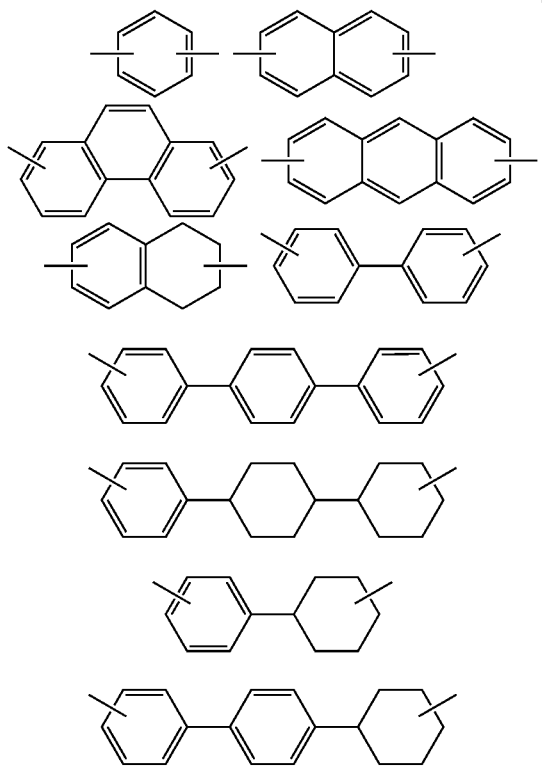

in chemical formula group (2), a portion or all of hydrogen atoms may be substituted with a halogen atom, in addition, the respective ring structures may be a hetero ring in which a carbon atom is substituted with another atom.

2. A liquid crystal display comprising:
a pair of substrates;
a liquid crystal layer interposed between the pair of substrates;
a horizontal alignment film formed on at least one of the pair of substrates; and
a polymer layer formed on the horizontal alignment film,
wherein the polymer layer is formed by the polymerization of at least two or more kinds of monomers added into the liquid crystal layer,
at least one monomer of said two or more kinds of monomers have a structure that generates a radical when irradiated with visible light,
said two or more kinds of monomers include the following first and second monomers
first monomer

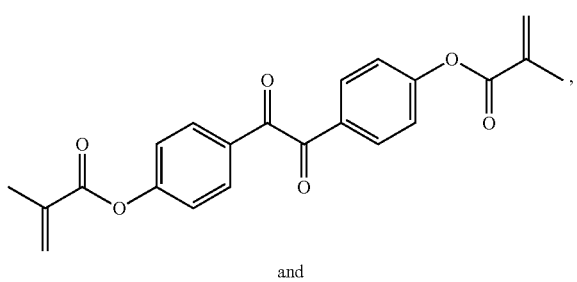

and second monomer

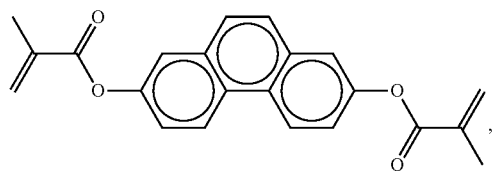

the horizontal alignment film is an alignment film to which an alignment-controlling function is imparted by photo-alignment treatment, and an alignment film material that forms said horizontal alignment film includes a photoreactive functional group, and the photoreactive functional group is at least one kind of functional group selected from a group consisting of a cinnamoyl group, a diarylethene group, an anthrylene group, a chalcone group, a coumarin group, a cinnamate group, an azobenzene group, and a stilbene group, wherein the polymer layer, in addition to structures formed by said first and second monomers, includes a structure represented by the following chemical formulas (3), (4), (5), (6) or (7) in a repeating unit,

[Chem. 3]

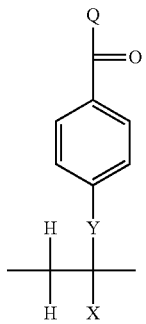

(3)

[Chem. 4]

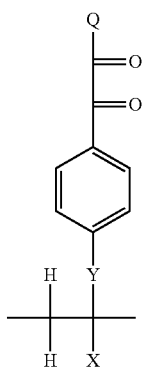

(4)

in chemical formulae (3) and (4), X represents —H or —CH$_3$, Y represents —O—, —COO—, —CONH—, or a direct bond, and Q represents a monovalent organic group,

[Chem. 5]

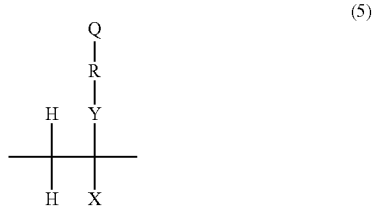

(5)

in chemical formula (5), X represents —H or —CH$_3$, Y represents —O—, —COO—, —CONH—, or a direct bond, R represents a divalent group including a benzene ring structure that is bonded at least to Y, and Q represents a monovalent organic group that includes a benzene ring structure that is bonded to the R moiety,

[Chem. 6]

(6)

in chemical formula (6), X represents —H or —CH$_3$, Y represents —O—, —COO—, —CONH—, or a direct bond, R represents a divalent group including a benzene ring structure that is bonded at least to Y, and Q represents a monovalent organic group that includes a polymer chain,

[Chem. 7]

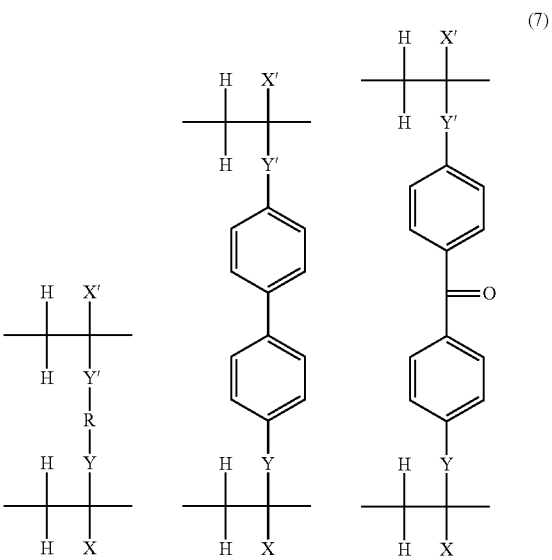

(7)

-continued

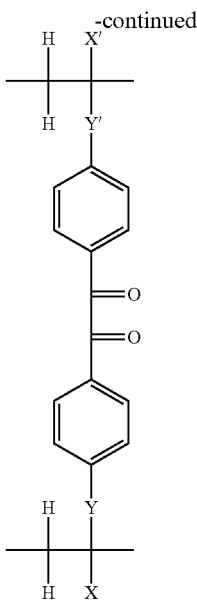

in chemical formula (7) each of X and X' independently represents —H or —CH₃, each of Y and Y' independently represents —O—, —COO—, —CONH—, or a direct bond, and R represents a divalent group including a benzene ring structure that is bonded at least to Y, and wherein said display employs an in-plane switching mode or fringe field switching mode as a display mode.

3. The liquid crystal display device according to claim 2, wherein said horizontal alignment film comprises polyimide, polyamic acid, polymaleimide, or polysiloxane.

4. The liquid crystal display device according to claim 2, wherein the polymer layer, in addition to structures formed by said first and second monomers, includes a structure represented by chemical formula (3) or chemical formula (4) in a repeating unit.

5. The liquid crystal display device according to claim 2, wherein the polymer layer, in addition to structures formed by said first and second monomers, includes a structure represented by chemical formula (5) in a repeating unit.

6. The liquid crystal display device according to claim 2, wherein the polymer layer, in addition to structures formed by said first and second monomers, includes a structure represented by chemical formula (6) in a repeating unit.

7. The liquid crystal display device according to claim 2, wherein the polymer layer, in addition to structures formed by said first and second monomers, includes a structure represented by chemical formula (7) in a repeating unit.

8. A liquid crystal display device comprising:
a pair of substrates;
a liquid crystal layer interposed between the pair of substrates;
a horizontal alignment film formed on at least one of the pair of substrates; and
a polymer layer formed on the horizontal alignment film,
wherein the polymer layer is formed by the polymerization of at least two or more kinds of monomers added into the liquid crystal layer,
at least one monomer of said two or more kinds of monomers have a structure that generates a radical when irradiated with visible light,
said two or more kinds of monomers include the following first and second monomers first monomer

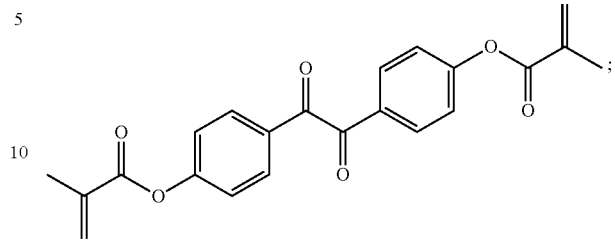

and second monomer

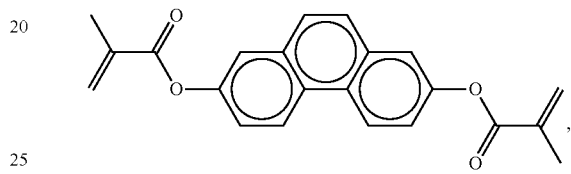

the horizontal alignment film is an alignment film to which an alignment-controlling function is imparted by photo-alignment treatment, and
an alignment film material that forms the horizontal alignment film includes a cyclobutane skeleton in a repeating unit,
wherein the polymer layer, in addition to structures formed by said first and second monomers, has a structure represented by the following chemical formulas (8), (10), (11), (12), (13), or (14) in a repeating unit,

[Chem. 8]

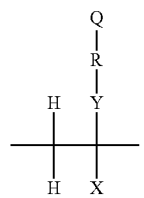

(8)

in chemical formula (8), X represents —H or —CH₃, Y represents —O—, —COO—, —CONH—, or a direct bond, Q represents a monovalent organic group, and R represents a divalent group including a structure selected from the following chemical formula group (9),

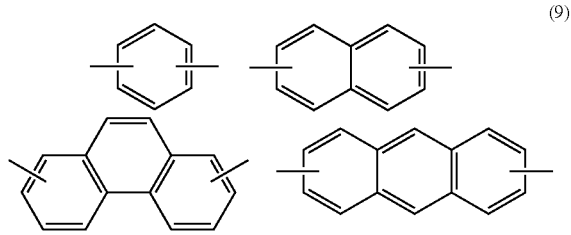

(9)

-continued

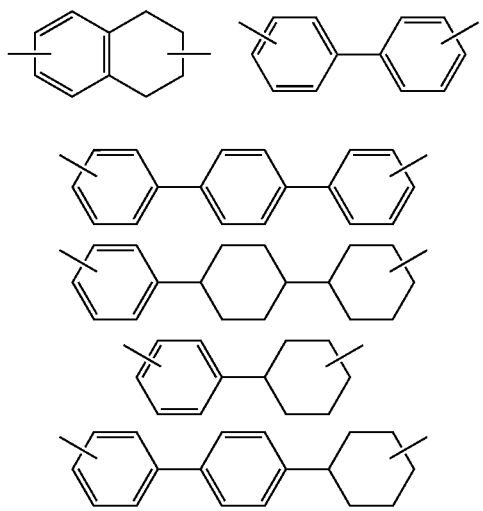

in chemical formula group (9), a portion or all of hydrogen atoms may be substituted with a halogen atom, in addition, the respective ring structures may be a hetero ring in which a carbon atom is substituted with another atom,

[Chem. 10]

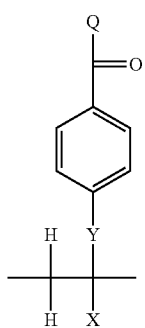

(10)

[Chem. 11]

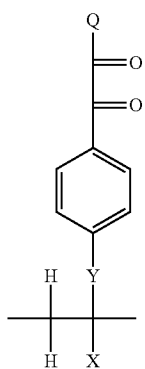

(11)

in chemical formulae (10) and (11), X represents —H or —CH$_3$, Y represents —O—, —COO—, —CONH—, or a direct bond, and Q represents a monovalent organic group,

[Chem. 12]

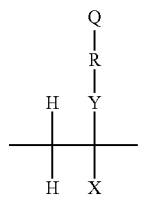

(12)

in chemical formula (12), X represents —H or —CH$_3$, Y represents —O—, —COO—, —CONH—, or a direct bond, R represents a divalent group including a benzene ring structure that is bonded at least to Y, and Q represents a monovalent organic group that includes a benzene ring structure that is bonded to the R moiety,

[Chem. 13]

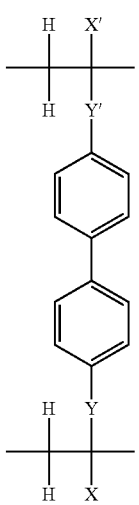

(13)

in chemical formula (13), X represents —H or —CH$_3$, Y represents —O—, —COO—, —CONH—, or a direct bond, R represents a divalent group including a benzene ring structure that is bonded at least to Y, and Q represents a monovalent organic group that includes a polymer chain,

[Chem. 14]

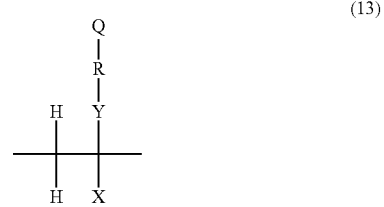

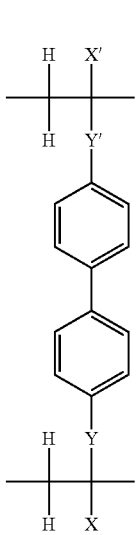 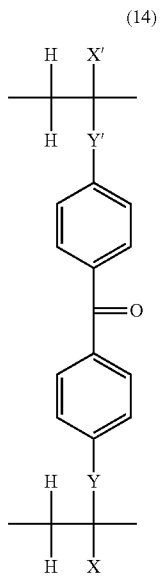

(14)

-continued

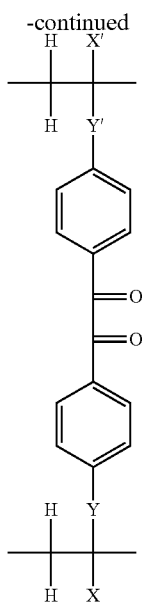

in chemical formula group (14) each of X and X' independently represents —H or —CH₃, each of Y and Y' independently represents —O—, —COO—, —CONH—, or a direct bond, and R represents a divalent group including a benzene ring structure that is bonded at least to Y, and wherein said display employs an in-plane switching mode or fringe field switching mode as a display mode.

9. The liquid crystal display device according to claim 8, wherein said horizontal alignment film comprises polyimide, polyamic acid, polymaleimide, or polysiloxane.

10. The liquid crystal display device according to claim 8, wherein the polymer layer, in addition to structures formed by said first and second monomers, has a structure represented by chemical formula (8) in a repeating unit.

11. The liquid crystal display device according to claim 8, wherein the polymer layer, in addition to structures formed by said first and second monomers, includes a structure represented by chemical formula (10) or chemical formula (11) in a repeating unit.

12. The liquid crystal display device according to claim 8, wherein the polymer layer, in addition to structures formed by said first and second monomers, has a structure represented by chemical formula (12) in a repeating unit.

13. The liquid crystal display device according to claim 8, wherein the polymer layer, in addition to structures formed by said first and second monomers, has a structure represented by chemical formula (13) in a repeating unit.

14. The liquid crystal display device according to claim 8, wherein the polymer layer further includes at least one kind of structure selected from chemical formula group (14) in a repeating unit.

* * * * *